United States Patent [19]

Freeman

[11] Patent Number: 5,632,007

[45] Date of Patent: May 20, 1997

[54] INTERACTIVE SYSTEM AND METHOD FOR OFFERING EXPERT BASED INTERACTIVE PROGRAMS

[75] Inventor: Michael J. Freeman, Kings Point, N.Y.

[73] Assignee: ACTV, Inc., New York, N.Y.

[21] Appl. No.: 311,019

[22] Filed: Sep. 23, 1994

[51] Int. Cl.$^6$ .................................................. G06F 17/00
[52] U.S. Cl. .............................. 395/75; 395/50; 395/77
[58] Field of Search ............................. 395/13, 50–51, 395/60–61, 75–76, 77; 434/321

[56] References Cited

U.S. PATENT DOCUMENTS

| | | |
|---|---|---|
| Re. 32,776 | 11/1988 | Saylor. |
| Re. 34,340 | 8/1993 | Freeman. |
| 2,612,533 | 9/1952 | Homrighous. |

(List continued on next page.)

FOREIGN PATENT DOCUMENTS

| | | |
|---|---|---|
| 16314 | 10/1980 | European Pat. Off. . |
| 128481 | 12/1984 | European Pat. Off. . |
| 314572 | 5/1989 | European Pat. Off. ......... H04N 7/16 |
| 994233 | 6/1965 | Germany. |
| 4-207885 | 7/1992 | Japan. |
| 6-165170 | 6/1994 | Japan. |
| WO8102961 | 10/1981 | WIPO. |
| WO9403851 | 2/1994 | WIPO. |

OTHER PUBLICATIONS

Campbell, "Optimal decision making in a business simulation"; System Sciences, 1989 Annual Hawaii International conference, vol. III, pp. 822–831 1989.

Martial et al, "An interactive planner for open systems"; Artificial Intelligence Applications, 1988 Conference, pp. 293–298, 1988.

Tsuruta et al, "A knowledge based interactive train scheduling system aiming at large scale complex planning expert systems"; International workshop on artificial intelligence for industrial applications pp. 490–495, 1988.

Harless, et al., "Interactive Videodisc Case Studies for Medical Education," Tenth Annual Symposium, Oct. 25–26, 1986.

Bock, "Videodisk Standards: A Software View of the Technology," 8012 S.M.P.T.E. Journal, vol. 92 (1983).

Kim, Test Equipment for Digital Still a Puzzle, Multichannel News, May 27, 1991, p. 24.

Powell, Digitizing TV Into Obsolescence, New York Times, Oct. 20, 1991.

Waters et al., Talking Back to the Tube, Newsweek, Dec. 3, 1990, pp. 56 57.

(List continued on next page.)

*Primary Examiner*—Tariq R. Hafiz
*Attorney, Agent, or Firm*—Dorsey & Whitney LLP

[57] ABSTRACT

A method of programming an interactive scenario on a multi-track storage media is disclosed. The interactive scenario includes a number of time-synchronized frames on separable data streams which are related in content to one-another. The interactive scenario is played back on an apparatus which selectively retrieves the data streams at a given time. A derision-making goal is defined for the interactive scenario. Once the goal has been defined, a set of rules is developed, preferably using knowledge derived from an expert, which lead to the defined goal. The rules relate hierarchically whereby the conclusions of at least some of the rules are premises for other rules. The rules also logically relate whereby the conclusion of a final rule or rules corresponds to the decision making goal. If the rules require premises to be obtained, queries are generated to interactively ask for the premises. The rules, premises, and queries are mapped into time-synchronized frames on a plurality of data streams. The streams are stored in a storage media for future retrieval. The frames may be arranged according to the hierarchy for providing a continuous flow of interactive conversation to ultimately reach the decision-making goal. The frames alternatively may be arranged to correspond to a "folded" hierarchy in order to conserve the number of required data streams. The retrieval method may dynamically provide the stored data streams to conserve the number of data streams required at any one time by the interactive scenario.

10 Claims, 10 Drawing Sheets

U.S. PATENT DOCUMENTS

| | | | |
|---|---|---|---|
| 2,777,901 | 1/1957 | Dostert . | |
| 2,826,828 | 3/1958 | Hamilton . | |
| 2,908,767 | 10/1959 | Fritzinger . | |
| 2,921,385 | 1/1960 | Hamilton . | |
| 3,008,000 | 11/1961 | Morchand . | |
| 3,020,360 | 2/1962 | Gratian et al. . | |
| 3,194,895 | 7/1965 | Treadwell . | |
| 3,221,098 | 11/1965 | Feldman et al. . | |
| 3,245,157 | 4/1966 | Laviana . | |
| 3,255,536 | 6/1966 | Livingston . | |
| 3,273,260 | 9/1966 | Walker . | |
| 3,284,923 | 11/1966 | Leslie . | |
| 3,343,280 | 9/1967 | Tolnai . | |
| 3,366,731 | 1/1968 | Wallerstein . | |
| 3,387,084 | 6/1968 | Hine et al. . | |
| 3,440,342 | 4/1969 | Beltrami . | |
| 3,477,144 | 11/1969 | Stillit . | |
| 3,484,950 | 12/1969 | Serrell et al. . | |
| 3,485,946 | 12/1969 | Jackson et al. . | |
| 3,538,621 | 11/1970 | Mayeda . | |
| 3,546,791 | 12/1970 | Koos et al. . | |
| 3,575,861 | 4/1971 | Flossmor . | |
| 3,602,582 | 8/1971 | Torricelli . | |
| 3,623,238 | 11/1971 | Laplume et al. . | |
| 3,643,217 | 2/1972 | Morphew et al. | 340/825.22 |
| 3,665,615 | 5/1972 | Laplume . | |
| 3,708,891 | 1/1973 | Rosov . | |
| 3,725,571 | 4/1973 | Justice . | |
| 3,730,980 | 5/1973 | Kirk . | |
| 3,757,225 | 9/1973 | Ulicki . | |
| 3,763,377 | 10/1973 | Weston | 307/140 |
| 3,774,316 | 11/1973 | Maier . | |
| 3,814,841 | 6/1974 | Ulicki . | |
| 3,825,674 | 7/1974 | Justice . | |
| 3,833,760 | 9/1974 | Tickle . | |
| 3,849,594 | 11/1974 | Justice . | |
| 3,857,999 | 12/1974 | Justice . | |
| 3,860,745 | 1/1975 | Takada . | |
| 3,902,007 | 8/1975 | Justice . | |
| 3,916,092 | 10/1975 | Justice . | |
| 3,936,595 | 2/1976 | Yanagimachi et al. . | |
| 3,947,972 | 4/1976 | Freeman . | |
| 3,988,528 | 10/1976 | Yanagimachi et al. . | |
| 3,991,266 | 11/1976 | Baer . | |
| 4,034,990 | 7/1977 | Baer . | |
| 4,040,088 | 8/1977 | Hannan . | |
| 4,044,380 | 8/1977 | Justice et al. . | |
| 4,078,316 | 3/1978 | Freeman . | |
| 4,199,781 | 4/1980 | Doumit | 348/96 |
| 4,245,245 | 1/1981 | Matsumoto et al. . | |
| 4,264,924 | 4/1981 | Freeman . | |
| 4,264,925 | 4/1981 | Freeman et al. | 348/11 |
| 4,290,142 | 9/1981 | Schnee et al. . | |
| 4,292,649 | 9/1981 | Macheboeuf . | |
| 4,305,131 | 12/1981 | Best . | |
| 4,331,974 | 5/1982 | Cogswell et al. . | |
| 4,333,152 | 6/1982 | Best . | |
| 4,361,730 | 11/1982 | Barber et al. . | |
| 4,381,522 | 4/1983 | Lambert . | |
| 4,399,329 | 8/1983 | Wharton | 370/69.1 |
| 4,422,105 | 12/1983 | Rodesch et al. . | |
| 4,439,784 | 3/1984 | Furukawa et al. . | |
| 4,445,137 | 4/1984 | Panofsky . | |
| 4,445,187 | 4/1984 | Best . | |
| 4,507,680 | 3/1985 | Freeman . | |
| 4,516,156 | 5/1985 | Fabris et al. . | |
| 4,530,008 | 7/1985 | McVoy . | |
| 4,536,791 | 8/1985 | Campbell et al. . | |
| 4,546,382 | 10/1985 | McKenna et al. . | |
| 4,555,730 | 11/1985 | Briggs . | |
| 4,569,026 | 2/1986 | Best . | |
| 4,571,640 | 2/1986 | Baer . | |
| 4,573,072 | 2/1986 | Freeman . | |
| 4,574,305 | 3/1986 | Campbell et al. . | |
| 4,591,248 | 5/1986 | Freeman . | |
| 4,599,611 | 7/1986 | Bowker et al. . | |
| 4,602,279 | 7/1986 | Freeman . | |
| 4,616,261 | 10/1986 | Crawford et al. . | |
| 4,635,132 | 1/1987 | Nakamura . | |
| 4,644,515 | 2/1987 | Allebest et al. . | |
| 4,647,980 | 3/1987 | Steventon et al. . | |
| 4,694,490 | 9/1987 | Harvey et al. . | |
| 4,701,896 | 10/1987 | Allebest et al. . | |
| 4,704,725 | 11/1987 | Harvey et al. . | |
| 4,733,301 | 3/1988 | Wright, Jr. . | |
| 4,734,764 | 3/1988 | Pocock et al. . | |
| 4,750,036 | 6/1988 | Martinez . | |
| 4,763,317 | 8/1988 | Lehman et al. . | |
| 4,768,087 | 8/1988 | Taub et al. | 348/3 |
| 4,777,529 | 10/1988 | Schultz et al. . | |
| 4,780,757 | 10/1988 | Bryer et al. . | |
| 4,780,758 | 10/1988 | Lin et al. . | |
| 4,785,349 | 11/1988 | Keith et al. . | |
| 4,786,967 | 11/1988 | Smith, III et al. . | |
| 4,807,031 | 2/1989 | Broughton et al. . | |
| 4,816,905 | 3/1989 | Tweedy et al. . | |
| 4,821,101 | 4/1989 | Short . | |
| 4,839,743 | 6/1989 | Best et al. . | |
| 4,847,690 | 7/1989 | Perkins . | |
| 4,847,698 | 7/1989 | Freeman . | |
| 4,847,699 | 7/1989 | Freeman . | |
| 4,847,700 | 7/1989 | Freeman . | |
| 4,855,827 | 8/1989 | Best . | |
| 4,862,268 | 8/1989 | Campbell et al. . | |
| 4,866,693 | 9/1989 | Baer . | |
| 4,870,591 | 9/1989 | Cicciarelli et al. | 364/468.14 |
| 4,875,096 | 10/1989 | Baer et al. . | |
| 4,876,592 | 10/1989 | Von Kohorn . | |
| 4,884,974 | 12/1989 | DeSmet | 434/317 |
| 4,894,789 | 1/1990 | Yee . | |
| 4,905,094 | 2/1990 | Pocock et al. . | |
| 4,916,633 | 4/1990 | Tychonievich et al. | 395/76 |
| 4,918,516 | 4/1990 | Freeman . | |
| 4,918,620 | 4/1990 | Ulug | 395/75 |
| 4,924,303 | 5/1990 | Brandon et al. . | |
| 4,926,255 | 5/1990 | Von Kohorn . | |
| 4,930,019 | 5/1990 | Chu . | |
| 4,941,040 | 7/1990 | Pocock et al. | 348/7 |
| 4,949,170 | 8/1990 | Yanagidaira et al. . | |
| 4,965,825 | 10/1990 | Harvey et al. . | |
| 4,967,368 | 10/1990 | Bolling et al. | 395/61 |
| 4,972,328 | 11/1990 | Wu et al. | 395/75 |
| 4,975,771 | 12/1990 | Kassatly . | |
| 4,987,486 | 1/1991 | Johnson et al. . | |
| 4,988,111 | 1/1991 | Gerlizt et al. . | |
| 4,989,233 | 1/1991 | Schakowsky et al. . | |
| 4,989,234 | 1/1991 | Schakowsky et al. . | |
| 4,991,011 | 2/1991 | Johnson et al. . | |
| 4,994,908 | 2/1991 | Kuban et al. . | |
| 5,001,554 | 3/1991 | Johnson et al. . | |
| 5,010,400 | 4/1991 | Oto . | |
| 5,010,500 | 4/1991 | Makkuni et al. . | |
| 5,014,125 | 5/1991 | Pocock et al. . | |
| 5,023,707 | 6/1991 | Briggs . | |
| 5,034,807 | 7/1991 | Von Kohorn . | |
| 5,043,891 | 8/1991 | Goldstein et al. | 364/419.1 |
| 5,051,822 | 9/1991 | Rhoades . | |
| 5,053,883 | 10/1991 | Johnson . | |
| 5,055,924 | 10/1991 | Skutta . | |
| 5,057,915 | 10/1991 | Von Kohorn . | |
| 5,077,607 | 12/1991 | Johnson et al. . | |

| | | | | | | |
|---|---|---|---|---|---|---|
| 5,090,708 | 2/1992 | Gerlitz et al. | | 5,526,478 | 6/1996 | Russell, Jr. et al. ............... 395/154 |
| 5,093,718 | 3/1992 | Hoarty et al. | | 5,537,141 | 7/1996 | Harper et al. ............... 348/12 |
| 5,109,414 | 4/1992 | Harvey et al. | | | | |
| 5,132,992 | 7/1992 | Yurt ............... 375/240 | | | | |
| 5,133,079 | 7/1992 | Ballantyne et al. | | | | |
| 5,157,491 | 10/1992 | Kassatly. | | | | |
| 5,171,107 | 12/1992 | Rhoades. | | | | |
| 5,174,759 | 12/1992 | Preston et al. | | | | |
| 5,176,520 | 1/1993 | Hamilton. | | | | |
| 5,177,604 | 1/1993 | Martinez. | | | | |
| 5,210,611 | 5/1993 | Yee et al. | | | | |
| 5,220,420 | 6/1993 | Hoarty et al. | | | | |
| 5,227,874 | 7/1993 | Von Kohorn. | | | | |
| 5,236,199 | 8/1993 | Thompson, Jr. | | | | |
| 5,239,463 | 8/1993 | Blair et al. ............... 364/410 | | | | |
| 5,239,617 | 8/1993 | Gardner et al. ............... 395/12 | | | | |
| 5,247,347 | 9/1993 | Litteral et al. | | | | |
| 5,318,450 | 6/1994 | Carver. | | | | |
| 5,340,317 | 8/1994 | Freeman ............... 434/321 | | | | |
| 5,404,393 | 4/1995 | Remillard ............... 379/96 | | | | |
| 5,405,152 | 4/1995 | Katanics et al. ............... 463/2 | | | | |
| 5,442,389 | 8/1995 | Blahut et al. ............... 348/7 | | | | |
| 5,488,411 | 1/1996 | Lewis et al. ............... 348/8 | | | | |

OTHER PUBLICATIONS

Will it Revolutionize HDTV?, Broadcasting, Jun. 4, 1990, pp. 33–34.

Video Storage In Digital Transmission, Specs Technology, Cable Television Laboratories, vol. 3, No. 7, Sep. 1991, pp. 1–6.

Kim, First All–Digital HDTV Developed by Video Cipher, Multichannel News, Jun. 11, 1990, p. 35.

Kim, ATC: Technical Tidal Wave to Engulf Cable Industry, Multichannel News, Aug. 13, 1990, pp. 33–34.

Kim, Jerrold Offers Cable Digital Compression, Multichannel News, Mar. 11, 1991, p. 6.

Dawson, Compression on the Fast Track, Cablevision, Apr. 22, 1991, pp. 22 30.

Gault, Turning Cold Box Into Interactive TV, Crain's New York Business, Jul. 15, 1991, p. 17.

Gilder, Now or Never, Forbes, Oct. 14, 1991, pp. 188–198.

FIGURE 8A

| | T0 | T1 | T2 | T3 |
|---|---|---|---|---|
| 101 | Hello. How old are you? | <15, switch to 101; 15-40, switch to 102; 41-60, switch to 103; >60, switch to 104 | 1 —> M1 | What is your gender (male or female)? | If M, switch to 101; If F, switch to 102 | M1+0 —> M1 | Thanks sir. How long have you been playing? | <1, switch to 101; 1-3, switch to 102; 3-5, switch to 103; >5, switch to 104 |
| 102 | UNUSED | 0 —> M1 | What is your gender (male or female)? | If M, switch to 101; If F, switch to 102 | M1+2 —> M1 | Thanks miss. How long have you been playing? | <1, switch to 101; 1-3, switch to 102; 3-5, switch to 103; >5, switch to 104 |
| 103 | UNUSED | 2 —> M1 | What is your gender (male or female)? | If M, switch to 101; If F, switch to 102 | UNUSED |
| 104 | UNUSED | 4 —> M1 | What is your gender (male or female)? | If M, switch to 101; If F, switch to 102 | UNUSED |

FIGURE 8B

| | T3 | | T4 | | T5 | T6 |
|---|---|---|---|---|---|---|
| 101 | M1+3 → M1 | What are you rated? | Ch. switch to 104<br>A switch to 101<br>B switch to 102<br>C switch to 103 | M1+0 → M1 | A Hit hard a lot<br>B on occasion<br>C rarely<br>D never | A switch to 101<br>B switch to 102<br>C switch to 103<br>D switch to 104 | 0 + M1 → M1<br>1 → M3 | How often do you play per week | <1 switch to 101<br>2 switch to 102<br>3 switch to 103<br>>3 switch to 104 |
| 102 | M1+2 → M1 | What are you rated? | Ch. switch to 104<br>A switch to 101<br>B switch to 102<br>C switch to 103 | M1+1 → M1 | A Hit hard a lot<br>B on occasion<br>C rarely<br>D never | A switch to 101<br>B switch to 102<br>C switch to 103<br>D switch to 104 | 1 + M1 → M1<br>2 → M3 | How often do you play per week | <1 switch to 101<br>2 switch to 102<br>3 switch to 103<br>>3 switch to 104 |
| 103 | M1+1 → M1 | What are you rated? | Ch. switch to 104<br>A switch to 101<br>B switch to 102<br>C switch to 103 | M1+3 → M1 | A Hit hard a lot<br>B on occasion<br>C rarely<br>D never | A switch to 101<br>B switch to 102<br>C switch to 103<br>D switch to 104 | 2 + M1 → M1<br>3 → M3 | How often do you play per week | <1 switch to 101<br>2 switch to 102<br>3 switch to 103<br>>3 switch to 104 |
| 104 | M1+0 → M1 | What are you rated? | Ch. switch to 104<br>A switch to 101<br>B switch to 102<br>C switch to 103 | M1+5 → M1 | A Hit hard a lot<br>B on occasion<br>C rarely<br>D never | A switch to 101<br>B switch to 102<br>C switch to 103<br>D switch to 104 | 3 + M1 → M1<br>4 → M3 | How often do you play per week | <1 switch to 101<br>2 switch to 102<br>3 switch to 103<br>>3 switch to 104 |

FIGURE 8C

| | T6 | T7 | T8 | T9 |
|---|---|---|---|---|
| 101 | 2 + M1 --> M1<br>"J" --> M4 | Weight?<br>A 25-100<br>B 101-150<br>C 151-200<br>D >200 / A switch to 101<br>B switch to 102<br>C switch to 103<br>D switch to 104 | 2 + M1 --> M1 / I now have all the info I need. / M1 > 26 switch to 102<br>17 ≤ M1 ≤ 25 switch to 103<br>14 ≤ M1 ≤ 16 switch to 103<br>else switch to 101 | The following racquet is the most appropriate. | 10 ≤ M1 ≤ 13 switch to 102<br>5 ≤ M1 ≤ 9 switch to 103<br>4 ≥ M1 switch to 104 |
| 102 | 1 + M1 --> M1<br>"J" --> M4 | Weight?<br>A 25-100<br>B 101-150<br>C 151-200<br>D >200 / A switch to 101<br>B switch to 102<br>C switch to 103<br>D switch to 104 | 1 + M1 --> M1 / I now have all the info I need. / M1 > 26 switch to 102<br>17 ≤ M1 ≤ 25 switch to 103<br>14 ≤ M1 ≤ 16 switch to 103<br>else switch to 101 | I recommend the Zenith Model 206 | Switch to 101 |
| 103 | 1 + M1 --> M1<br>"K" --> M4 | Weight?<br>A 25-100<br>B 101-150<br>C 151-200<br>D >200 / A switch to 101<br>B switch to 102<br>C switch to 103<br>D switch to 104 | 0 + M1 --> M1 / I now have all the info I need. / M1 > 26 switch to 102<br>17 ≤ M1 ≤ 25 switch to 103<br>14 ≤ M1 ≤ 16 switch to 103<br>else switch to 101 | I recommend the Zenith Model 208 | Switch to 101 |
| 104 | 0 + M1 --> M1<br>"K" --> M4 | Weight?<br>A 25-100<br>B 101-150<br>C 151-200<br>D >200 / A switch to 101<br>B switch to 102<br>C switch to 103<br>D switch to 104 | 4 + M1 --> M1 / I now have all the info I need. / M1 > 26 switch to 102<br>17 ≤ M1 ≤ 25 switch to 103<br>14 ≤ M1 ≤ 16 switch to 103<br>else switch to 101 | I recommend the Zenith Model 210 | Switch to 101 |

FIGURE 8D

| | T9 | T10 | T11 | T12 | |
|---|---|---|---|---|---|
| 101 | The above racquet is the most appropriate | M3 = 1 switch to 101<br>M3 = 2 switch to 102<br>M3 = 3 switch to 103<br>M3 = 4 switch to 104 | The string tension should be set at 43 | M2 = "X" switch to 101<br>M2 = "Y" switch to 102 | Since you are male, get the wide grip | M4 = "J" switch to 101<br>M4 = "K" switch to 102 | Since you play 3 times a week, buy two racquets | Switch to 101 |
| 102 | I recommend the Zenith Model 212 | M3 = 1 switch to 101<br>M3 = 2 switch to 102<br>M3 = 3 switch to 103<br>M3 = 4 switch to 104 | The string tension should be set at 50 | M2 = "X" switch to 101<br>M2 = "Y" switch to 102 | Since you are female, get the slender grip | M4 = "J" switch to 101<br>M4 = "K" switch to 102 | Since you don't play very often, one is enough | Switch to 101 |
| 103 | I recommend the Zenith Model 214 | M3 = 1 switch to 101<br>M3 = 2 switch to 102<br>M3 = 3 switch to 103<br>M3 = 4 switch to 104 | The string tension should be set at 55 | M2 = "X" switch to 101<br>M2 = "Y" switch to 102 | UNUSED | | UNUSED | |
| 104 | I recommend the Zenith Model 216 | M3 = 1 switch to 101<br>M3 = 2 switch to 102<br>M3 = 3 switch to 103<br>M3 = 4 switch to 104 | The string tension should be set at 65 | M2 = "X" switch to 101<br>M2 = "Y" switch to 102 | UNUSED | | UNUSED | |

INTERACTIVE SYSTEM AND METHOD FOR OFFERING EXPERT BASED INTERACTIVE PROGRAMS

BACKGROUND OF THE INVENTION

1. Field of the Invention

The present invention relates generally to interactive programming, and more particularly to a media independent method of creating, storing, and presenting interactive programming which emulates conversational responses and is capable of performing expert analysis.

2. Description of the Related Art

"Interactive" systems are well known in the art, especially in the context of interactive television or telephone systems. In most cases, the "interactivity" provided by these systems enables a user of the system to control what is seen or heard on the system by pressing buttons on a two-way controller or touch-tone keypad. However, these systems provide only a low level of conversational responsiveness.

Systems which emulate interactive conversation are also well known in the art. These systems use a variety of different techniques to achieve interactive conversation, and have ordinarily had limited success at conversations which were more than mere simple question and answer sessions. In the context of multiple choice response systems for children, such systems are exemplified in U.S. Pat. Nos. 2,921,385; 3,020,360; 2,826,828; 3,623,238; 3,546,791; 3,273,260; 3,665,615; 3,245,157; 3,284,923; 3,538,621; 3,477,144; 3,708,891; 3,255,536; 2,777,901; 2,908,767; 3,774,316; 3,194,895; 3,484,950; 3,343,280; and 3,763,577, by way of example.

Various interactive television systems have also been developed. For example, U.S. Pat. Nos. 4,264,924, 4,264,925, and 4,507,680 (each of which is hereby incorporated by reference) disclose interactive cable television systems. A copending interactive system, entitled "Simulcast of Interactive Signals with a Conventional Video Signal", Ser. No. 08/289,499, filed on Aug. 12, 1994, provides an interactive system which is usable by both conventional television viewers and interactive television viewers. Another copending application, Ser. No. 08/166,608 (a continuation of Ser. No. 07/797,298, filed on Nov. 25, 1991, now abandoned), which was filed on Dec. 13, 1993, and is entitled "Compressed Digital-Data Interactive Television System" provides an interactive system with data compression and seamless switching. Other examples of interactivity utilizing television may be found in U.S. Pat. Nos. 4,602,279; 4,847,700; 4,573,072; 4,847,698; 4,847,699; and 4,918,516, for example. Generally, these systems require a separate microprocessor to perform selection and memory functions and are not concerned with expert system analysis.

While such prior systems have the flexibility and memory-like characteristics for establishing personalized interactive environments, they do not provide interactive programming which enables programming of media-independent complex interactive conversations in which the interactive conversation includes expert analysis of specific user problems, for example, financial analysis services, document creation, point-of-sale marketing systems, etc.

Some of the systems which are capable of performing expert analysis are known in the computer field as rule-based expert systems. In a rule-based expert system, a knowledge base provides expert-quality solutions to problems in a specific area. Generally, the information in the knowledge-base is extracted from human experts and the system attempts to emulate their problem-solving methodology. With their inherent limitations (see "Computer Engineering Handbook", C. H. Chen, Editor, McGraw-Hill, Inc. pp. 9.1–9.35), such systems are useful for performing expert analysis in certain situations. These expert systems have not been implemented on an interactive basis to a large audience.

What is needed is a system which can take interactive systems to the next level, a level which allows for more complex and thereby meaningful conversation and interaction between the system and the user. Such a system would perform expert analysis and be usable by a very large number of people simultaneously, and would not be limited to any particular transmission technology.

SUMMARY OF THE INVENTION

The present invention is a method of programming and presenting an interactive scenario. The interactive scenario comprises a plurality of time-synchronized separable data streams which are related in content to one-another. The data streams may be broadcast over a transmission medium or stored on a storage medium. The interactive scenario is designed for playback on an apparatus comprising means for selectively retrieving the data streams from the storage medium or transmitted signal; the selected data streams are chosen as a result of expert analysis.

In the programming method, a decision-making goal is defined for the interactive scenario. This may be, for example, the diagnosis of a problem, or the creation of a document on the basis of information entered by a user. Once the goal has been defined, a set of rules is developed which will logically lead to the defined goal. Each rule has one or more premises, and a conclusion. The rules relate hierarchically in that the conclusions of at least some of the rules are premises for other rules. Moreover, the rules are logically related to the goal in that the conclusion of at least one of the rules corresponds to the decision making goal.

Usually, the premises of the rules are translated into queries, or questions which are presented to the user. The queries may be in multiple-choice, true-false, or short answer form. However, premises which are not user-dependent (i.e., those determined by the conclusions of one or more other rules) need not be translated to queries because user responses are unnecessary.

From the hierarchial rules and queries (if necessary), a hierarchial tree is created to implement the rules. The hierarchial tree contains branches which are dependant on the user solicited answer to a query or the existence of a premise.

The hierarchial tree is mapped into a plurality of time-synchronized frames, located on a plurality of data streams. Each frame has an informational field which corresponds to a query, a premise, a conclusion, an informational message, or combinations thereof. A command portion of each frame contains frame identification data and information relating to the rule. This information may direct the interactive terminal to switch to certain streams depending on the user's response, may instruct the interactive terminal to store and/or perform functions on a variable, or may contain a software instruction for the interactive terminal. Each frame comprises a complete message which provides a response which corresponds to the selection of the stream. Alternatively, the frames may refer to internal or external storage available to the interactive terminal which contains prestored messages.

The frames are located on the streams in a predetermined sequence according to the hierarchial tree for providing a continuous flow of interactive conversation for ultimately reaching the decision-making goal. An information portion of some of the flames contains queries soliciting user interactive responses. The user interactive responses correspond to other associated frames which contain further queries, premises or conclusions related to the previously presented queries.

In the simplest embodiment the positioning of the frames in the data streams corresponds to the hierarchial tree. Because the structure of the program may not necessarily require use of all of the channels at any given time, a dynamic embodiment is disclosed which dynamically varies the number of channels in use based on the needs of the expert analysis as embedded in the program. In a further embodiment, stream switching commands and efficient frame positioning conserve channel capacity by causing the locations of the frames to correspond to "folded" branches of the hierarchial tree. This results in a system with fewer hierarchial tree branches and thus fewer data streams.

The data streams containing the frames are stored in a storage media, thus preserving the hierarchial interactive scenario for future recall and presentation. When the hierarchial interactive scenario is to be presented, the storage media recalls the stored data streams and provides them to an interactive terminal sequentially at frame intervals. In a preferred embodiment, the storage media only provides the data streams containing useful information, thus dynamically allocating the data streams. The interactive terminal gathers a frame at a time from the provided data streams and interactively presents the queries, conclusions, or informational messages contained on the gathered frame to one or more users. The users respond to the queries by entering a response, which is interpreted by the interactive terminal in conjunction with the command portion of the gathered frame. The interactive terminal will continue with the interactive presentation by using the result of the interpretation to obtain a next frame from the same, or different, data stream, according to the command portion of the gathered frame. The appropriate frames will be presented to the user until the entire interactive scenario has been completed.

Accordingly, it is an object of the present invention to provide expert analysis in the form of real-time interactive conversation in a manner which is suitable for mass-distribution.

It is a further object of the invention to enhance the personalized feedback responses of an interactive system through the provision of expert analysis embedded primarily in interactive programming.

It is a further object of the invention to provide interactive programming for an expert system in a manner which requires little processing at an interactive terminal.

It is a further object of the invention to provide a hierarchial expert system using frames which represent hierarchial tree branches, or folded hierarchial tree branches.

It is a further object of the invention to provide an interactive terminal which requires minimal processing capability and yet still can present a conclusion as defined by an expert rule-base.

It is yet a further object of the invention to provide a hierarchial interactive presentation of rules which leads to a conclusion as defined by an expert system.

BRIEF DESCRIPTION OF THE DRAWINGS

FIGS. 8A, 8B, 8C, and 8D depict a generalized representation of frame locations and contents to realize Example 2.

DESCRIPTION OF THE PREFERRED EMBODIMENTS

Figure 1:
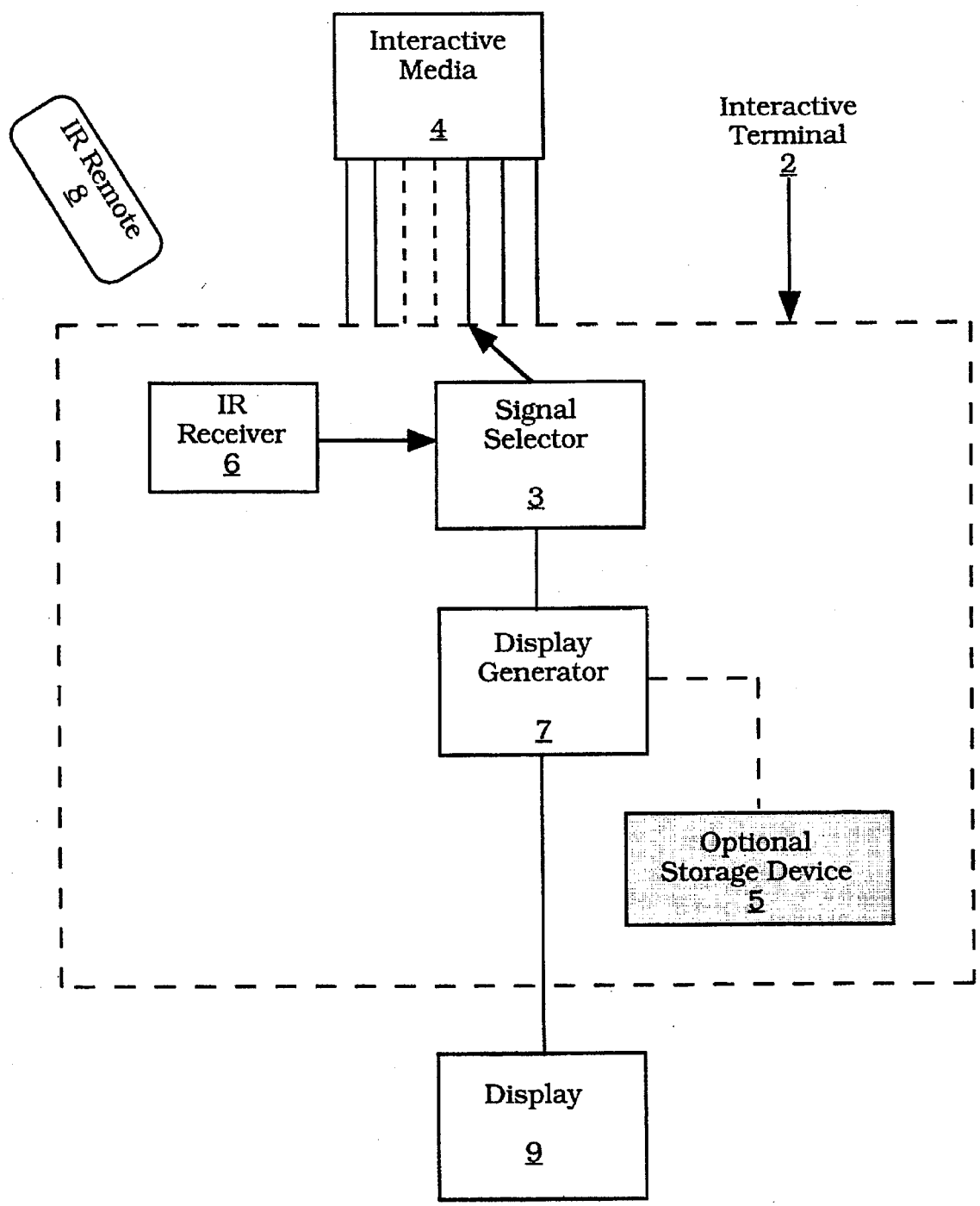
FIG. 1 is a block diagram, of an apparatus for implementing the present interactive expert system.

Referring now to the drawings in detail, and initially to FIG. 1, the present invention employs an interactive terminal 2 for receiving and selecting among interactive data streams from interactive media 4 for presentation to a user on a display 9. The terminal 2 contains an infrared remote receiver 6 for receiving user inputs from infrared remote control 8. The receiver 6 is connected to a signal selector 3 which selects the data stream and frame that will be received by the interactive terminal 2. A display generator 7 is connected to the signal selector 3 for generating an interactive display based on the received data stream. In an alternative embodiment, optional storage device 5 is used to present prestored messages, as directed by the received frame on the selected data stream.

The terminal 2 is a multitrack playback device, storage device or multichannel reception device. The data streams are separate channels or tracks of audio, video, graphics or other data from the interactive media 4. Interactive media 4 can be any of the following: a multi-track audio tape; a multi-track video tape; a video tape or a transmitted signal having a single video channel and multiple audio and/or graphics channels (the audio channels may be transmitted in serial, parallel or any other suitable method, as disclosed in copending U.S. patent application Ser. No. 08/289,499, filed Aug. 12, 1994, entitled "Simulcast of Interactive Signals With a Conventional Video Signal" (herein incorporated by reference)); multiple channels of video; a single video signal having several video channels compressed and multiplexed thereon; a two-way video system in which the content of a single video channel may be switched at the head end based upon user input sent from the user site; a randomly accessible storage media (i.e., a magnetic disk or tape, CD-ROM or other optical storage media, or any other type of randomly accessible storage media); or any type of storage media in which separable tracks of audio or video may be stored for later transmission. All of the above transmission schemes of the present invention can be implemented as analog or digital signals and sent on any transmission medium including cable, satellite, broadcast television, microwave, personal communications networks, etc. If the interactive media 4 is randomly accessible, the interactive conversation streams are either physically stored on individual disk track, or in contiguous or non-contiguous files. In conjunction with a disk drive, or an appropriate interface for the type of storage media in use, the information stored on each track is output to a user of the system in near real-time fashion. In one embodiment, multiple video channels are stored on CD/ROM or VideoDisc, and the disc controller handles separating the multiple channels for selective display.

In a preferred embodiment, the interactive media 4 comprises one or more cable television channels, each of which contains a transmitted audio and video signal. Using a multiple choice controller 8, the user is able to selectively respond to queries, the responses are their input into the expert system which commands a switch between the channels on the media 4 so as to conventionally display the information from each channel on display 10.

If audio or video tapes are used as the multi-track media 4, or CD-ROM or disk storage is used, the media is preferably removable from the playback means so that different interactive expert systems may be inserted and used in the system. This makes it possible to record a library of prerecorded media, covering a wide array of topics. For example, the media 4 may contain expert analysis for product selection, diagnoses, document creation, etc. The system may employ a microprocessor for reading the tracks from a randomly accessible media, if such media is used.

As described below, while the present invention emulates memory functions during operation, a complex microprocessor is not required to perform any of these memory functions. The logic and memory functions are achieved through hierarchial rule-based programming. Nonetheless, one detailed example of the invention (Example 2) is described, which utilizes a microprocessor to handle memory functions for providing a more complex degree of expert analysis.

The interactive conversation is preferably seen and/or heard by the user using a conventional television display, and/or speaker or headphones. If the stored conversations on the multi-track media are in digital form, i.e. CD-ROM magnetic disc, or digital audio tape (DAT), the interactive terminal 2 contains a digital-to-analog converter to convert the digital information streams to analog signals which may be output to a conventional audio/video display or speaker.

While not required, storage device 5 may be used by the interactive terminal 2 when the data from the interactive media 4 contains instructions directing the terminal to present "canned" interactive messages stored in the storage device 5.

Multiple choice controller 8 may be an infra-red remote control, or may be any other appropriate device to select an interactive response to a query. Depending on the particular application, inputs may be provided via a keyboard or even a touch screen. Once a response is entered, the system may change data streams appropriately, store the response for future branching, or execute an algorithm utilizing the response. Alternatively, a multiple choice controller 8 is not necessary with the present invention if the interactive terminal incorporates buttons enabling the user to make selections on the terminal itself.

As previously indicated, while prior art interactive systems are able to engage users in relatively simple interactive conversations, and emulate memory functions, the prior art does not disclose a method of creating an interactive program which is capable of performing expert analysis or complex functions.

The present system emulates a computerized expert system in presenting an interactive program without the use of a microprocessor for tracking all user responses. Moreover, the video display which is preferred in the present invention provides a more realistic expert analysis by enabling the system to explain how and why a particular conclusion was reached, to display recommended products, and to demonstrate how to accomplish a needed repair once the system has concluded that such a repair is necessary.

1. Implementation of a Rule-Base.

In order to properly program the interactive expert system, a rule-base must be defined. This enables the system to emulate the decision making process of a human expert at a remote location, i.e., at the interactive terminal and the television display. By placing the present system at remote sites, the interactive expert system enables complex problems to be solved during separate interactive conversations with many users. The present invention introduces a way to organize in-depth knowledge into an interactive programming methodology to ensure proper emulation of the decision-making process.

Figure 2:
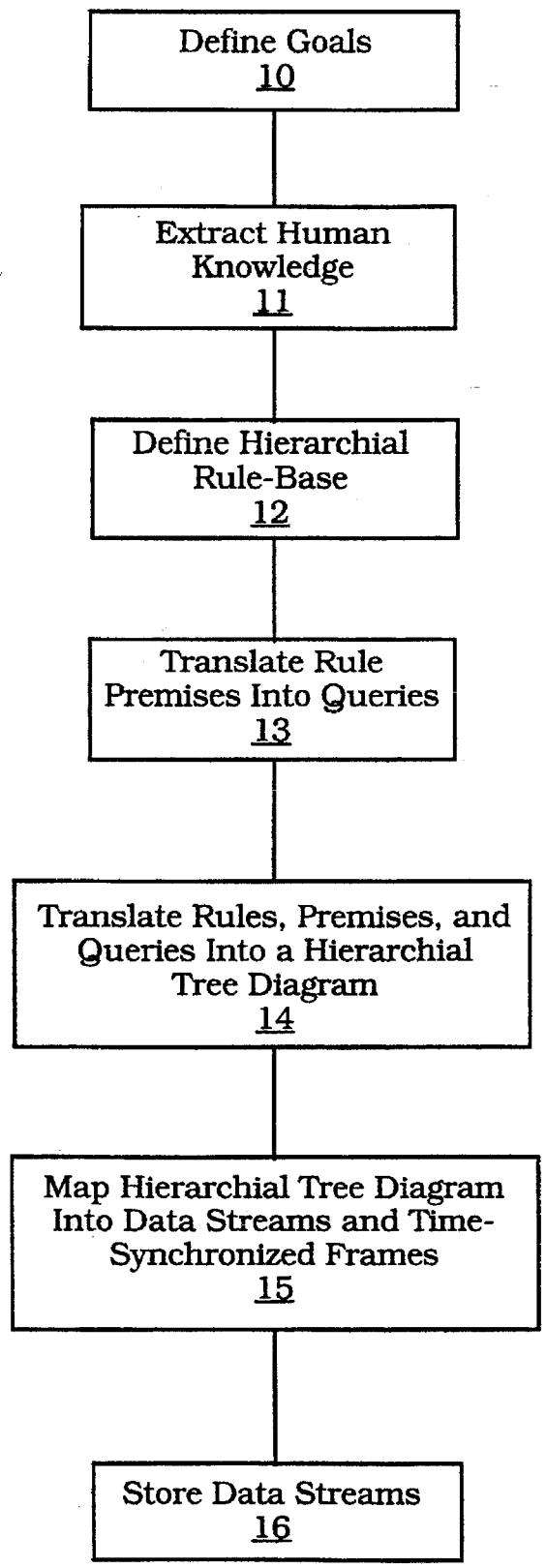
FIG. 2 is a block diagram showing the steps in the present method of programming an interactive expert system.

FIG. 2 shows a flow chart of the method of the present invention for implementing an interactive expert system. First, the goals of the expert system are defined at step 10. Next, the appropriate human knowledge is extracted to achieve those goals, step 11. Informative works, experts, and other sources are consulted to determine this knowledge. From the human knowledge, a hierarchial rule-base is defined at step 12. The hierarchial rule-base is an organizational characterization of the human knowledge.

Figure 3:
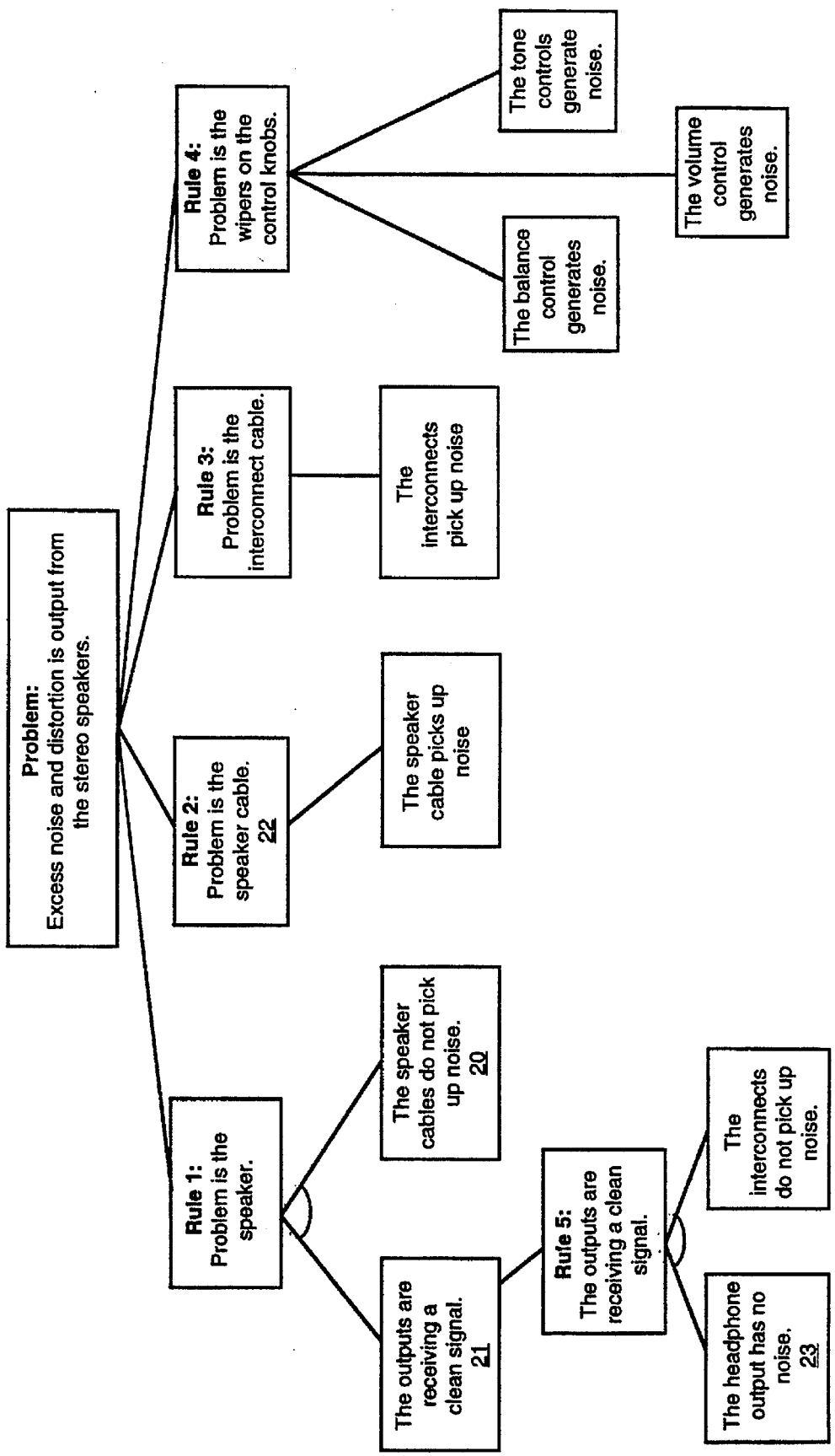
FIG. 3 is a hierarchical graph of an interactive expert system rule-base, discussed herein as Example 1.

The rule-base consists of a number of rules. Rules comprise mapping conclusions to one or more premises. The rule base is formulated to implement the human knowledge defined at step 11 and solve the goals defined at step 10. The rule-base is hierarchial because at least one premise of one rule is a conclusion of at least one other rule. Table 1, shown below, is an example of a rule-base. A graphical representation of the Table 1 rule-base is shown in FIG. 3.

If a rule assumes a premise which is user-determinative, the premise is translated into a query at step 13. The interactive system presents the query to the user to determine whether the premise is satisfied. For example, if a premise to a rule is "the car is red", the corresponding query "is the car red?" is generated to solicit the user's response whether the premise is satisfied. The query need not mirror the premise but could be anything which would prove or disprove the existence of the premise. For example, the query could be "is the car blue?". If an affirmative answer is received, the interactive terminal will know that the premise "the car is red" is not satisfied. If a negative answer is received, other queries must be presented, until the interactive terminal has enough information to determine whether the premise is satisfied.

Figure 4:
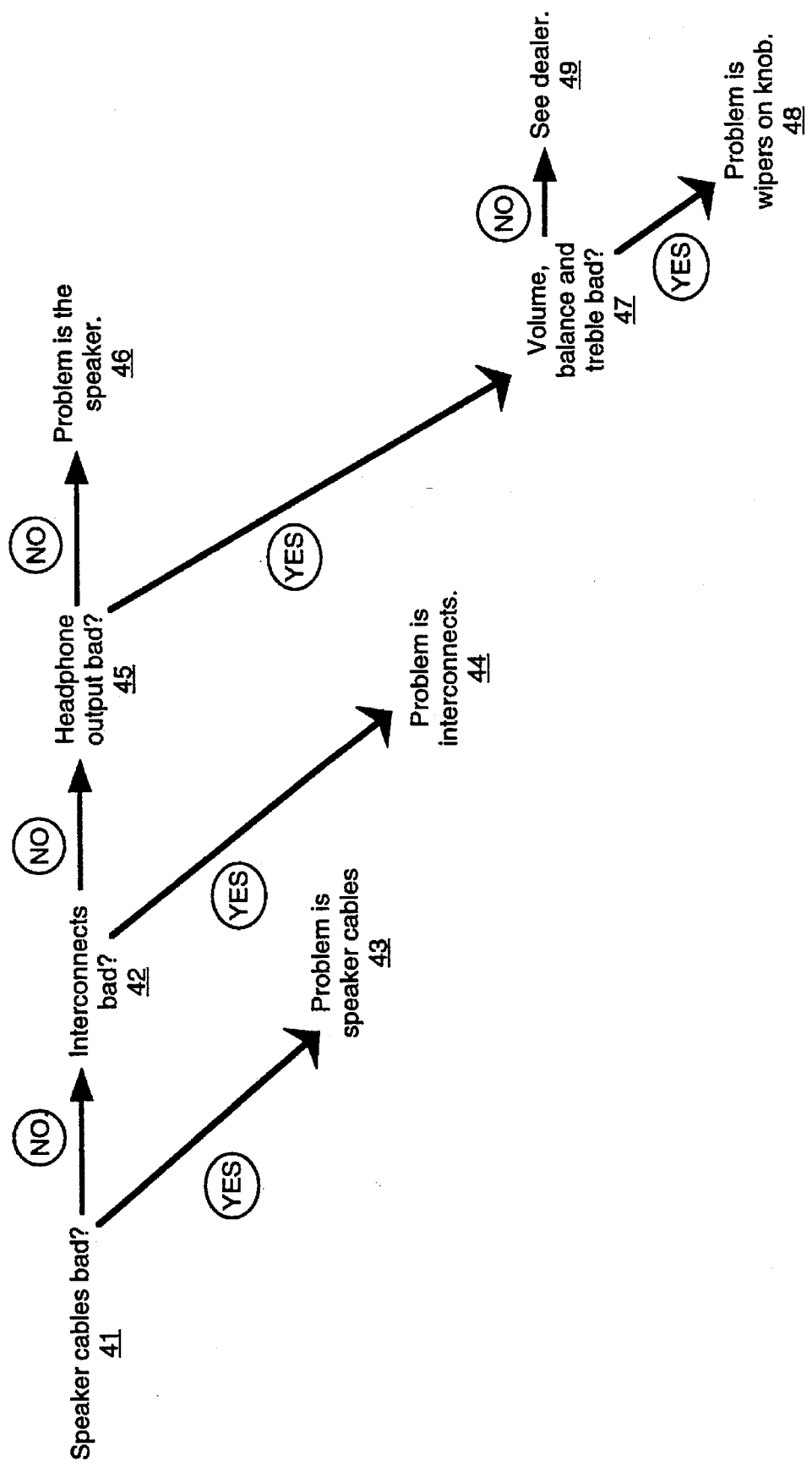
FIG. 4 is a hierarchial tree diagram of the FIG. 3 hierarchial graph.

Next, the remaining rules, premises, and queries are formed into a hierarchial tree diagram, step 14. The hierarchial tree diagram broadly represents a logical solution (using branches) to the problem and corresponds to the rule-base and queries. An example of a hierarchial tree diagram is shown in FIG. 4.

Figure 5:
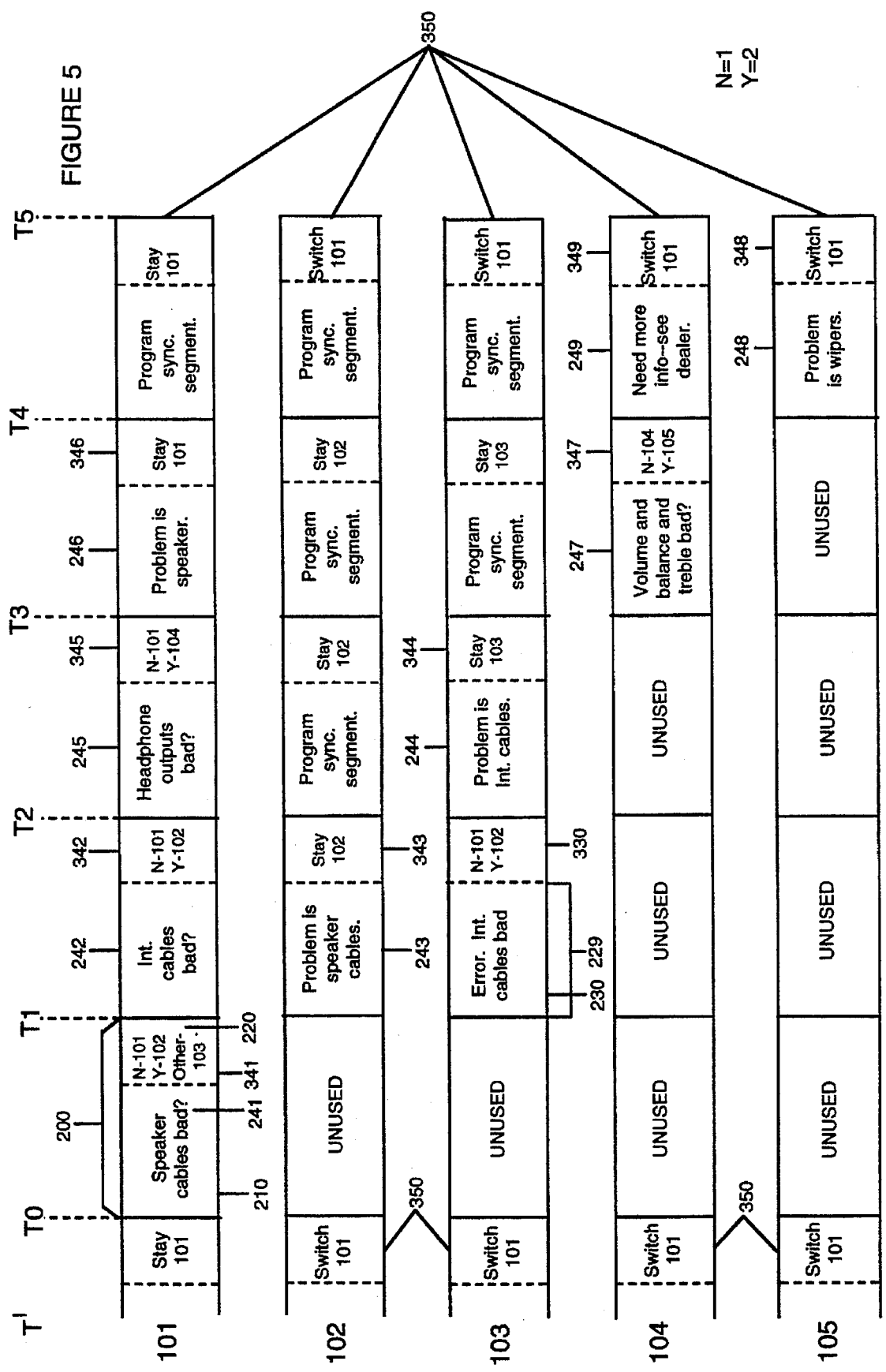
FIG. 5 depicts the positioning of frames on five data streams in one embodiment to realize the FIG. 4 hierarchial tree.
Figure 6:
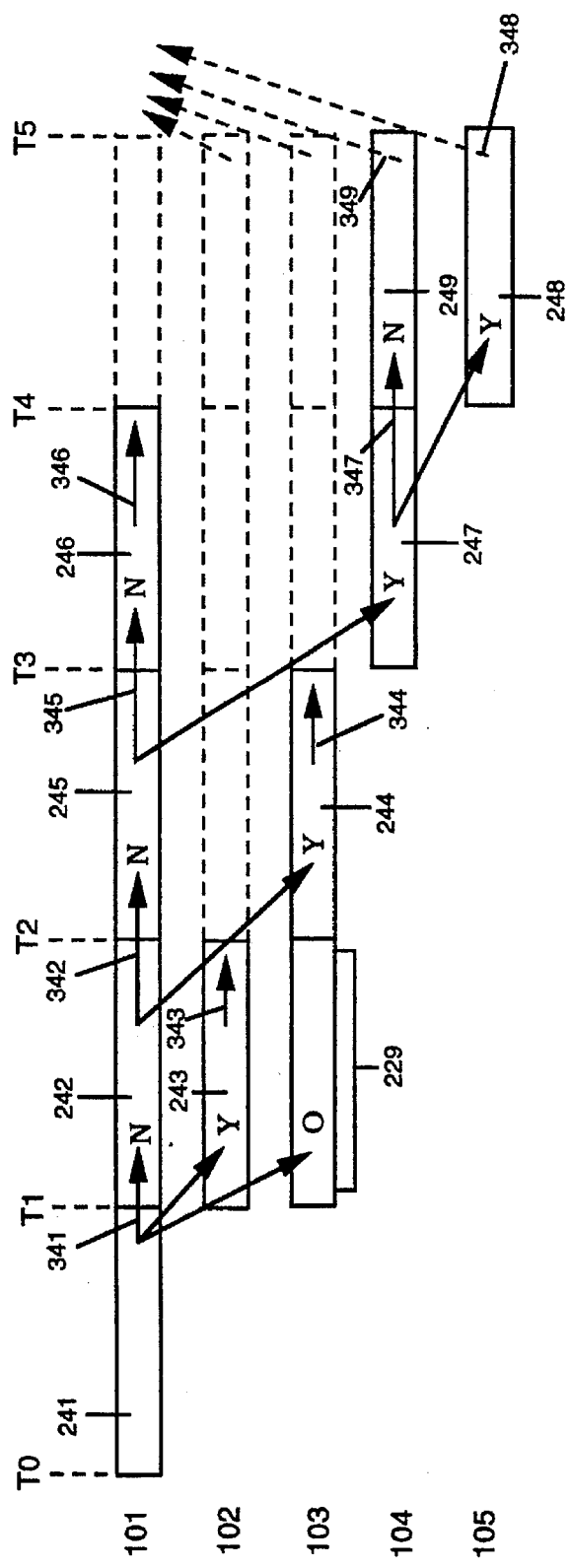
FIG. 6 depicts a generalized representation of the FIG. 5 frame locations in a manner which illustrates the hierarchial nature of the embodiment.
Figure 7:
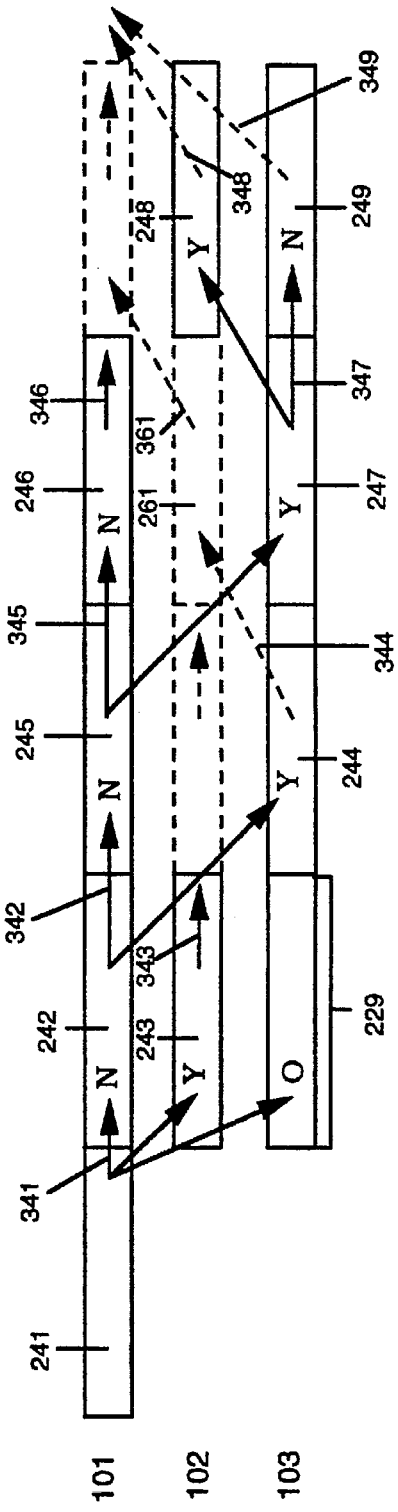
FIG. 7 depicts a generalized representation of an alternative embodiment employing compressed hierarchial tree branches to realize the hierarchial tree of FIG. 4 using only three data streams.

The hierarchial tree diagram is mapped into a plurality of data streams, step 15. The data streams contain frames which are time synchronized between the data streams. The frames contain information on the data stream relationships depending on user input. In essence, the data streams represent and implement the branches of the tree diagram. FIG. 5 depicts a series of data streams mapped from the hierarchial tree diagram of FIG. 4. In a preferred embodiment, the mapping step includes the step of "folding" the hierarchial tree diagram. The "folding" step reduces the number of required data streams by causing branching between and among streams which are no longer necessary to implement the hierarchial tree diagram, thereby conserving channel capacity. An example of a "fold" is shown in FIGS. 6–7, FIG. 7 representing one way of folding the embodiment depicted in FIG. 6.

Lastly, the data streams are stored in an appropriate storage device, step 16. In a preferred embodiment described below, the data streams are stored in a manner which enables dynamic retrieval of the data streams. In this embodiment, an indicator relating to those streams containing information is also stored. During retrieval, only those streams identified by the indicator are retrieved.

The following two examples will be used to demonstrate the method of the invention:

1) A simple expert system for diagnosing a problem occurring in a stereo system, the problem being that excess noise and distortion are heard through the loudspeakers.

2) A point-of-sale kiosk, which includes a microprocessor, for assisting a user in choosing a tennis racket.

As previously mentioned and shown in FIG. 2, the first step in the process of programming an interactive expert system is to define the goals of the derision-making algorithm of the system 10. The goals define the type of expert advice the system provides to the user. More specifically, the goals of the system define an end point, final decision or product of the expert system. Referring to example (1) above, the goal is to analyze the user's responses to queries, and to determine the most likely reasons that the stereo speakers contain excess noise and distortion. In example (2), the system inquires into the user's playing habits and personal characteristics, and recommends a tennis racket which is most suited to the user's style of play and experience.

In the first example, a rule-base to determine the cause of excess noise output from loudspeakers in a stereo system is defined as shown in Table 1.

TABLE 1

Rule-base for Stereo System Diagnostic Example

Rule 1:
If the outputs are getting a clean signal,
and the speaker cable does not pick up noise,
then the problem is with the speakers.
Rule 2:
If the speaker cable picks up noise,
then the problem is with the speaker cable.
Rule 3:
If the interconnect cable picks up noise,
then the problem is with the interconnect cable.
Rule 4:
If the volume control knob, or
the balance knob,
or the tone control knobs,
cause noise, then
the problem is with the wipers on the knobs.
Rule 5:
If the headphone output has no noise,
and the interconnect cable does not pick up noise,
then the outputs are getting a clean signal.

In this simple example, rules are defined for locating the source of a problem in a stereo system where the speaker audio contains excess distortion and noise. Each rule contains at least one premise and a conclusion. The premise corresponds to the phrases above beginning with "if". The conclusion corresponds to the phrase following "then". For example, in Rule 1, the premises are (1) "the outputs are getting a clean signal" and (2) "the speaker cable does not pick up noise." The conclusion is "the problem is with the speakers." The premises are translated into queries, preferably presented to the user via the display monitor either prior to storage, or after reception by the interactive terminal. For Rule 1, the query may be (1) "are the speaker cables picking up noise when the cables are moved while the stereo is playing?" The query is preferably not this brief, but provides a detailed interactive presentation, as shown below in Table 2. Premise (2) for Rule 1 is hierarchically dependant on the outcome of Rule 5, and uses the outcome of Rule 5 as its premise without requiring the use of a query. However, the two premises of Rule 5 require queries. A hierarchial relationship occurs because the conclusion of Rule 5 "the outputs are receiving a dean signal", is used as a premise of Rule 1.

Once the rules have been defined, they are organized into a hierarchical rule-base of the type graphically shown in FIG. 3. The hierarchical rule-base graph visually shows the hierarchical organization of the premises and the conclusions. In order to code an expert system into a multi-channel television system and take advantage of the parallelism of the multiple channels, parallelism in the knowledge base should be identified. Parallelism are points in the logic of the system where the decision making paths separate based upon the existence of a premise. Because the premises are often translated into queries, it is also correct to define a parallelism as occurring at points in the logic of the system where the decision making paths separate based upon answers to queries. For example, using the hierarchical graph shown in FIG. 3, the response to the premise "the speaker cables do not pick up noise" establishes parallel paths. If the speaker cables do not pick up noise, a path is established to determine if the problem is the speaker (Rule 1). If the speaker cables do pick up noise, then a parallel path is established to inform the user that the problem is with the speaker cable 22. These two paths are mutually exclusive. Accordingly, an important aspect of efficient coding of a multi-data stream system is to identify mutually exclusive paths which may be coded in parallel on the data streams. Once the hierarchical graph has been constructed and parallelism identified, the expert system implementation may be mapped into a multi-data stream format and the resulting interactive presentation stored on a storage medium.

In addition to simply recording the queries and conclusions, the system may include an explanation facility which is implemented in the interactive presentation. This is possible because of the hierarchial relationship between the rules. At any one conclusion, the prior premises are satisfied, since such premises had to have been met to arrive at the conclusion. For example, the system need not merely state that "the noise is caused by the speaker", but rather the more informative response that "the noise is caused by the speaker because the speaker cables do not pick up the noise, the headphone output has no noise, and the interconnect cables do not pick up the noise." Thus, each rule provides a context for the explanation given in the expert system. A user is informed of the underlying basis of the expert system's opinion. The system thus emulates dialog between the system user and an expert.

The rule base is preferably organized so that the premise that is most likely to fail or is easiest to confirm is tried first. This provides the opportunity to eliminate a rule (and to thereby conserve valuable media space) as early in the search as possible. In Rule 1 of the stereo example, the premise "the speaker cables do not pick up noise" 20 should be tested before "the outputs are receiving a dean signal" 21, because the determination of premise 20 will resolve Rule 2.

As with conventional expert-based systems, there is always a certain ambiguity in the rule-base. This occurs because the premises are often incapable of positive proof. For example, in Rule 5, the premise "the headphone output has no noise" 23 may be true, but the conclusion "the outputs are receiving a dean signal" may be false if the noise is caused by a subsequent stage of the amplifier located after the internal headphone signal pickup. Thus, as with all expert systems, the heuristic nature of the system causes the system to be only as good as the underlying rule-base. This problem can be mitigated to some extent in an alternative embodiment of the present invention using a processor and assigning probabilities to the mappings between premises, user responses, and conclusions. In the preferred embodiment, only those ambiguities which are known in advance may be compensated for by defining a field along the graph and including explanatory messages about the ambiguity in this field, i.e., "the system cannot determine what is wrong based on the information you have entered. Please check the service manual or call your authorized dealer."

2. Hierarchial Tree Diagram

Referring to FIG. 4, after the expert rule-base and hierarchial graph are constructed, some or all of the premises are translated into queries, and a hierarchial decision tree is developed for the interactive presentation. This enables the interactive provider to structure the interactive presentation in a format which is able to be easily received and accessed by one or more interactive terminals.

FIG. 4 illustrates one simple hierarchial tree diagram of the Table 1 rule base and FIG. 3 hierarchial graph. As described above, the "speaker cables do not pick up noise" premise of Rule 1 is presented first, because it is determinative of the outcome of Rule 2. Thus, the first branch of the tree 41 is a query "Do the speaker cables pick up noise?" (Table 2, below, shows a more complete indication of how the actual query preferably appears). This query is presented to the user with the display monitor 9. If the user indicates via the user interface 8 that the speaker cables pick up noise, then according to Rule 2, the problem is in the speaker cables 43. Thus, if a "yes" answer is received from the interactive response, the tree branches to a data stream to explain that the problem is with the speaker cables 43.

If the speaker cables do not pick up noise, the first premise of Rule 1 has been satisfied, and the interactive presentation moves to branch 42, to inquire about the second premise. The second premise is a conclusion of Rule 5, and thus a query relating to Rule 5 must be generated by the system. Since the Rule 5 premise "the interconnects do not pick up noise" is determinative of Rule 3, this premise is processed first. Thus, the second branch 42 presents the query "do the interconnects pick up noise?" If the interactive input indicates that the interconnects pick up noise, then rule 3 is satisfied, and the interactive terminal presents a summary of the problem, stating that "the problem is with the interconnects" 44.

If the interconnects are not generating noise, as indicated by the user interactive response, the first premise of Rule 5 has been satisfied, and a query directed to the second premise is generated for display to the user. The decision tree moves to branch 45 and queries the user "do the headphone outputs contain noise?" If the interactive response is "no", then all the conditions of rule 1 have been satisfied and the conclusion may be presented to the user that "the problem is the speaker" 46.

If the user had interactively responded that the headphone outputs contained noise, the premises of Rules 1–3 and 5 have not been satisfied and the presentation must move to the next untested rule, Rule 4. While Rules 1 and 5 required two premises to have been met (a logical "AND" function), Rule 4 differs in that it is satisfied if any of three preconditions are met (a logical "OR" function). Only one query covering the three alternatives needs to be generated to determine if a premise of Rule 4 is satisfied. Thus, the decision tree branches to a query 47, which states "does the balance control, volume control, or tone control generate noise?". If the answer is affirmative, the problem is with the resistive wipers on the rotary controls, and the presentation moves to a representation of this conclusion 48, "the problem is the wipers on the control knob which generated noise."

If the user interactive input indicates that the noise is not caused by the volume, balance, or tone controls, then none of the requisite premises of Rules 1–5 are met. At this point, the tree may branch to other more detailed questions, or the presentation may inform the user "the problem is probably in the electronics, consult your authorized dealer for repair" 49.

Once the hierarchial tree diagram has been constructed, it is a simple matter to store the interactive presentation for subsequent recall. To store the interactive presentation, time synchronized data streams containing frames are generated and stored.

3. Data Streams

Once a hierarchial tree diagram, similar to that shown in FIG. 4, has been constructed, the premises, queries, conclusions, and associated informational statements are mapped onto data streams. Information is embedded on the data streams in a plurality of frames, each frame comprising messages which are seen and/or heard in response to the selection of the data stream upon which the frame is embedded. Each of the frames on the various data streams comprise queries, conclusions, statements based upon the conclusions to the premises, and associated informational messages to provide context for the queries, premises and conclusions. The contents of the streams are related in real-time so that user choices presented in response to a premise result in a switch to data streams which are related hierarchically according to the hierarchial rule-base graph or in context to the premise which resulted in the channel switch. The frames on the various tracks relate in real-time and content so that an expert analysis occurs as the media is played back and the user responds to queries related to the premises of the expert system stored in the streams.

As a channel is selected in response to an interrogatory or based on the response to an earlier interrogatory, the information on the data stream corresponding to the particular selection is routed to the display. Embedded in the selected data stream at the time selection occurs is a frame segment having content corresponding to the selected response to the previous query. The queries, premises, conclusions, and explanatory messages may generally be contained on any or all of the various tracks provided they are synchronized properly so as to retain a timed relationship as discussed herein.

Referring to FIG. 5, a representation of data streams and flames are shown which realize the hierarchial diagram of FIG. 4. FIG. 5 shows five data streams 101–105. Although five data streams are shown in this embodiment, more or less can be provided as necessary. Each data streams 101–105 contains a first frame 200. Each frame 200 contains an information portion 210 and a command portion 220. The data streams 101–105 need not be formatted so that the command portion 220 succeeds the information portion 210, as shown in FIG. 5, but may be formatted in any way currently known to one of ordinary skill is the art. For example, the command portion 220 may precede the information portion 210 or may be interleaved with the information portion 210.

The information portion 210 preferably contains a representation of either a conclusion or a query. For example, the information portion 210 may state either "the problem is the speaker" 246 or "do you hear noise on the headphone output?" 245. The queries will solicit an interactive response from the user. Even the conclusions can require an interactive input, such as "the problem is with the speaker, press any key to continue."

The information portion 210 is not limited to text, but may also contain graphics, video, audio, or instruction codes. For example, the information portion 210 may contain a graphical or video representation of a man and a woman with accompanying audio of a voice asking "what is you gender? Enter 1 for male, 2 for female." Alternatively, the information portion 210 may contain an instruction code which references memory locations in a storage device 5 available to the interactive terminal. The interactive site uses the instruction code to reference the corresponding storage location for accessing "canned" interactive data.

In analog embodiments, the information portion 210 is preferably included in the vertical blanking interval of a conventional television signal, or on a dedicated channel. These and other acceptable techniques are taught in copending application Ser. no. 08/289,499, filed Aug. 12, 1994, entitled "Simulcast of Interactive Signals With a Conventional Video Signal", incorporated herein by reference.

The command portion 220 is preferably used both to control functions of the interactive terminal 20 and to define the hierarchial relationship between the frames 200. The command portion 220 contains branching data concerning the interactive terminal's response to specified user inputs. For example, the command portion 220 may contain algorithmic codes to match user inputs to system responses embodied in separate data streams. The coding may also be more complicated. For example, relative addressing of data streams may be used ("switch to the third lower stream"), variable assignments may be represented ("if user presses 1, store 3 in variable X"), and other well known instructions to an interactive processor may be included. The complexity of the command is tailored to the complexity of the interactive terminal which processes the command. Of course, suitable coding can be used to conserve the size of the command portion. Alternatively, the commands may contain codes that identify macros stored at the interactive terminal, the macros comprising the branching algorithms as depicted above.

Because the command portion 220 contains the information which defines the relationship between frames 200, the frames 200 preserve the hierarchial relationships of the hierarchial tree diagram (FIG. 4).

Returning to FIG. 5, the hierarchial branches occur through switching between data streams. It is evident that the hierarchial relationship between the frames is directly analogous to that of the branches in FIG. 4. In FIG. 5, information portions 241, 242, 245, and 247 correspond to queries 41, 42, 43, 45, and 47 in FIG. 4. The yes/no branches of the FIG. 4 queries are preserved in the command fields 341, 342, 345, and 347 of the frames shown in FIG. 5. For example, if the response to the query "are the interconnects picking up noise?" 42 (FIG. 4) is "No", then the tree diagram branches to "does the headphone output contain any noise" 45. In FIG. 5, the query 42 of FIG. 4 is stored in information portion 242, and the instructions on where to branch depending on the input are stored in command portion 342. The command portion 342 remains on channel 101 if the answer is "no", and switches to channel 102 if the answer is "yes". This correlates with the hierarchial tree diagram of FIG. 4. In FIG. 5, the conclusions represented in information portions 243, 244, 246, 248, and 249 correspond to conclusions 43, 44, 46, 48, and 49 of the hierarchial tree diagram shown in FIG. 4.

FIG. 5 shows one embodiment where the frames of the different data streams are synchronized. The frames are synchronously located in frame intervals between T1, T2, T3, T4, and T5. As depicted, the period between T3 and T4 appears longer than the period between T1 and T2. In a preferred embodiment, it is not required that the time intervals be identical, but only that the frames be synchronous. All the frames in FIG. 5 are shown to be synchronous, even though portions of the frames may be of different length, such as the information portions 242 and 243.

Because the number of actual branches in a given interactive scenario varies depending on the user's interactive responses, the interactive scenario reaches completion at different times. For example, in FIG. 5, the user has completed the interactive program at frame 243, 343 where the problem is the speaker cables. Had the user indicated that the speaker cables were not the cause of the problem, the user would be interacting with frame 242, 342. In this example, the interactive provider has included "program synchronization segments" in the frames which do not correspond to logical branches on the hierarchial tree diagram. The program synchronization segments are inserted into the channels to maintain a synchronous relationship amongst the channels for subsequent branching. This is done by placing a command to remain on the current stream in the command portion 343 of the final frame 243, 343. The information portion contains an informational message which is not required to be related to the rulebase, but is included to preserve the timing of the system. Frames subsequent to the program synchronization segments have further informational messages in the information portion, and commands to stay on the current channel in the information portion. Alternatively, if the problem is solved in frame 243, 343, a code could command the branch to a separate channel, not shown, which provides common programming or further instructional video until the end of the expert interaction.

It may not be desirable to maximize stream efficiency by reducing the number of parallel tree branches when coding a hierarchial rule-base into a hierarchial tree diagram, especially where multiple users are simultaneously involved with the interactive presentation. By purposefully coding to an inefficient hierarchial tree diagram (by using many data streams), the interactive program is structured to conclude at the same (or nearly the same) time for different possible interactive responses, reducing the necessity for program synchronization segments. For example, if an interactive TV program broadcast takes a half hour to conclude for user A and fifteen minutes to conclude for user B, user B may be unhappy to view fifteen minutes of program synchronization segments. Of course the program synchronization segments may be another short interactive program, which would be unavailable to user A. It is thus important to recognize that the artisan may wish to trade-off the number of streams and the length of time it takes to resolve the various decision tree branches to reach an overall conclusion.

At the final frames on the data streams, occurring at time T4, all the possible branches of the hierarchial tree diagram have been presented. The command portion of the final frames on each data stream may contain a command to switch to a single data stream so that the next interactive presentation may begin. The frames at time T4 and T' contain a command portion 350 instructing the interactive terminal to switch to data stream 101. This is desirable to conserve storage and media space. In fact, the data streams are preferably structured to be allocated dynamically, as described immediately below.

4. Dynamic Allocation of Data Streams

In a preferred embodiment, the data streams are provided dynamically from interactive media 4. The number of data streams actually provided to the interactive terminal is only the number of data streams actually carrying information. This results in a substantial saving of channel capacity, in the embodiment where data streams are encoded onto channels for transmission.

Referring to FIG. 2, the step of mapping the hierarchial tree diagram into data streams and time-synchronized frames 15 entails mapping only data streams which are required by the interactive scenario. For each frame interval it is only necessary to send the data streams actually carrying information. For example, referring to FIG. 4, the first step is to determine whether the speaker cables are bad 41. This requires one frame on a single data stream. Therefore, in the first frame interval T0–T1 (FIG. 5), only data stream 101 is provided to the interactive terminal. The frame intervals are shown in FIGS. 5 and 8 as the intervals between T0, TI, T2, ..., Tn.

In one embodiment, initially when the frames containing information (in the information and command portion) are stored, an indication of which frames in the data stream contain the information is also stored. This may be accomplished in a number of different ways. First, an index containing the number of data streams may be stored in the interactive media 4 during each frame interval. For each frame interval, the index would inform the interactive media 4 of the number of data streams containing information, and thus the number of data streams which should be generated for transmission. Alternatively, the index could comprise a list of data streams for each succeeding frame interval and whether the data streams should be generated for that frame interval.

A second method to store an indication of the data streams to be generated for transmission during a particular time interval is encoding the command portion of each frame with a field identifying the data streams that will be available on the succeeding frame interval. This method is advantageous because the interactive terminal 2 receives a frame containing information pertaining to the upcoming number of data streams. The interactive terminal may use this information to configure itself for data stream switches.

A third method to store an indication of the data streams to be generated is encoding the command portion of a frame on a designated data stream with an index (as described above) field identifying the data streams that will be available on the succeeding frame interval. For example, data stream 101 in FIG. 5 could contain an index field in each frame to inform the interactive media 4 how many data streams should be generated. Since the interactive terminal 2 may not receive the data stream containing the index field (depending on the interactive input from the user), the interactive media may not receive an indication of the number of data streams which will be presented on the next frame interval, unlike the second method, above. However, the invention will still function, as it is unnecessary (although desirable for the purpose of configuring the interactive terminal 2 in advance) for the interactive terminal 2 to know which data streams will be provided in the next frame interval. The interactive terminal merely switches to a data stream identified by the command portion of the frame and the user's interactive response.

With reference to FIG. 5, at time T0 the interactive provider need only supply a single data stream, at T1 two data streams, at T2 three data streams, and so on until five data streams are required at time T4. Thus, the interactive system is able to dynamically allocate the data streams between a single channel and as many channels as necessary. If the data streams were provided on television channels, then the number of channels required at the early times (T0 and T1) is effectively reduced. For example, four streams/channels are necessary for a query calling for four age brackets, while two streams/channels are required for a binary or polar query (ie. a yes/no query). Referring to FIGS. 5 and 8, the portions of the data streams labeled "unused" are preferably not provided during their corresponding frame intervals, dynamically reducing the number of data streams.

Alternatively, the interactive terminal may continue to process the prior data stream when a new interactive presentation is to occur. In this instance, redundant messages are placed on multiple data streams so that all users receive the same initial presentations no matter which data stream the user had concluded with in the previous interactive scenario. This alternative embodiment is stream-inefficient in that all the channels are being used throughout the interactive presentation, rather than just at the end, as in the previous embodiment.

A modification of this alternative embodiment is that the introductory messages of further interactive presentations present information relating to previous interactive presentations. In this case, all users do not receive the identical presentations when beginning new interactive programming. Since there are many possible commands to place in the command portion of the frames, dynamic allocation of data streams, and great flexibility in constructing the hierarchial tree diagram, the invention is very flexible and can be arranged in numerous configurations.

The data streams 101–105 need not be stored synchronously, but may be stored in any manner known to the artisan. The storage or recording method is not critical to the invention, as long as it is sufficient to enable the retrieval method to read the stored data streams synchronously.

5. Timing and Branching of Frames on the Data Streams.

Again referring to FIG. 5, the timing and frame contents are depicted as they occur on data streams 101–105. At time T0, the user has finished a previous interactive presentation and is beginning to interact with the stereo problem solving presentation. Since all the prior flames occurring at time T' contain instructions 350 to switch to stream 101, the interactive terminal only processes a single data stream 101. At time T1, the interactive terminal stays on stream 101 or switches to stream 102 depending on the user's response to the query 241 posed at time T0. At time T1, the interactive terminal receives streams 101 and 102 regardless of the user's selection. It is not necessary for the terminal to process all the incoming data streams. Only performing a simple switching operation and processing of the selected data stream is required of the interactive terminal. This continues until time T4 when all the possible branches on the tree have been presented. The frames at time T4 all have a command portion 350 instructing the interactive terminal to switch to stream 101 at the conclusion of the presentation. Thus, at time T5, the interactive processor is processing stream 101 again.

Another reason for beginning and ending on a single data stream is that it makes other data streams available for error processing. For example, in FIG. 5, frame 230, 330 is directed to a presentation dealing with a situation where the user had not selected "y" or "n" as instructed by frame 241, 341. The information portion 230 contains a message such as "you did not select 'y' or 'n', therefore it is assumed you pressed 'n' . . . "

Table 2 shows a possible script for the information portion of the frames depicted in FIG. 5 and the queries shown in FIG. 4. It is understood that this example represents the audio portion of the program, and that appropriate video may be included in the information portion of each frame as well. Information or instructions included in the command portion of the frames are shown enclosed by brackets { }.

The stream numbers 101–105 in Table 2 correspond to streams 101–105 in FIG. 5, while the times T'–T5 also correspond to the times T'–T5 shown in FIG. 5. The frames numbered in FIG. 5 also appear in Table 2, at their corresponding positions, although they have not been separately numbered in the Table.

TABLE 2

Script of Frame Contents for Stereo Diagnostic Example.

| Time | Stream 101 | Stream 102 | Stream 103 | Stream 104 | Stream 105 |
|---|---|---|---|---|---|
| T' | . . .<br>{stay on 101} | . . .<br>{switch to 101} | . . .<br>{switch to 101} | . . .<br>{switch to 101} | . . .<br>{switch to 101} |
| T0 | Welcome to the Electronic Repair Shop. I understand that you are having problems with your stereo because extra noise and distortion come out of the speakers. Let's see if I can help. Let's check those speaker cables. Grasp them one at a time and move them around while playing your stereo. Also, try and change the location of the speaker cables. Do you hear a change in the noise level or distortion when you move or change the location of the speaker cables? Press 1 for no, 2 for yes. {if 1 stay on 101, if 2 switch to 102, any other key-switch to 103.} | (unused) | (unused) | (unused) | (unused) |
| T1 | Well, it looks like the speaker cables are O.K., lets check the interconnect cables.<br><br>Try and wiggle the cables connecting the CD player, tuner, tape deck, or amplifier as the stereo is playing. | I see that the speaker wires are making noise as you move them while the unit is playing.<br><br>The problem is probably in the speaker wires, they are likely picking up interference from nearby electrical devices. | Ooops, you didn't select a 1 or 2. I'll assume you meant to pick 1; your speaker cables do not create any noise.<br><br>Try and wiggle the cables connecting the CD playe, tuner, tape deck, or | (unused) | (unused) |

TABLE 2-continued

Script of Frame Contents for Stereo Diagnostic Example.

| Time | Stream 101 | Stream 102 | Stream 103 | Stream 104 | Stream 105 |
|---|---|---|---|---|---|
|  | Do you hear a change in the noise and distortion as you are doing this?<br><br>Press 1 for no and 2 for yes.<br>{if 1, stay on 101, if 2 switch to 103.} | I suggest rearranging the speaker cable or puchasing shielded speaker cable.<br><br>{stay on 102} | amplifier as the stereo is playing.<br><br>Do you hear a change in the noise and distortion as you are doing this?<br>Press 1 for no and 2 for yes.<br><br>{if 1, switch to 101, if 2 stay on 103.} |  |  |
| T2 | It's good that the speaker cable and interconnects are working well. Lets check the headphone output on your amplifier to see if the noise is inside your amplifier as well as your speakers.<br><br>Do you hear the noise and distortion over headphones connected to the headphone output on your amplifier?<br><br>Press 1 for no, 2 for yes.<br><br>{if 1, stay on 101, if 2, switch to 104} | I am glad that I have been able to fix your problem.<br><br>Did you know that ACE Stereo's service shop is the #1 rated repair shop in the area?<br><br>{stay on 102} | If the interconnects are making noise when you move them around, it probably means that they are picking up electrical noise and distortion.<br><br>Try and rearrange the interconnect cables in a way to minimize the problem. You may also want to stack your equipment differently or purchase shielded interconnect cables.<br><br>Press any key to continue.<br>{Stay on 103} | (unused) | (unused) |
| T3 | Since there is no noise or distortion coming out of your headphone output, the problem is probably your speakers. They may be blown.<br><br>Remember that ACE stereo supply sells quality speakers from brands such as Base, KLH, Snell, Vandersteen, and Velodyne.<br><br>press any key to continue.<br>{stay on 101.} | When purchasing new speaker cables, you might want to also upgrade other components of your stereo for improved sound.<br><br>ACE sells quality stereo components from these brands: Adcom, Pioneer, Sony ES, and Krell.<br><br>{Stay on 102} | I was glad to be able to solve your problem.<br><br>Remember that the salespeople at ACE Stereo are eager to help you solve any other problems which may arise.<br><br>{stay on 103} | Hmmm. The noise must be coming from inside your equiptment. Lets now quickly check the control knobs.<br><br>Select "tape" from an input, but do not play your tape recorder. Set the volume to a normal level and slowly rotate the volume knob, balance knob, and tone control knob. Does rotating | (unused) |

TABLE 2-continued

Script of Frame Contents for Stereo Diagnostic Example.

| Time | Stream 101 | Stream 102 | Stream 103 | Stream 104 | Stream 105 |
|---|---|---|---|---|---|
| | | | | these knobs cause noise and distortion? Press 1 for no and 2 for yes. {if 1 stay on 104, if 2, switch to 105} | |
| T4 | I was glad to help solve your problem. It was fun to learn about your stereo system.<br><br>Please standby for another interactive program. | I hope you enjoyed your interactive presentation.<br><br>Please standby for another interactive program. | I hope you enjoyed your interactive presentation.<br><br>Please standby for another interactive program. | Gee I can't figure out what is wrong based upon the data available to me. I think its probably an electrical problem with one of your components.<br><br>I would suggest calling your authorized dealer.<br><br>Sorry that I couldn't help, but remember that I evolve just as experts do, so maybe next time you use me I'll have a better understanding of your equiptment.<br><br>Please standby for another interactive program. | Ah ha, the wipers on your control knobs have probably picked up dirt or oxidized over time. I bet you don't rotate those knobs all the way around very often.<br><br>Turn the power off and rotate the knobs freely to clean the resistive wipers. If this does not fix the problem, you will have to have a professional clean them for you.<br><br>ACE Stereo's service department is able to do this service for only $49.99.<br><br>I'm glad to have been of service. Please standby for another interactive program. |
| | {stay on 101} | {switch to 101} | {switch to 101} | {switch to 101} | {switch to 101} |
| T5 | {new program.} | (unused) | (unused) | (unused) | (unused) |

6. Folding the Branches on the Hierarchial Tree Diagram.

Note that in FIG. 5, the branches of the hierarchial tree diagram require the use of five data streams 101–105 at time T4. Although the system is capable of dynamically assigning data streams, there is another preferred way to reduce the number of data streams.

FIG. 6 shows a generalized hierarchial tree chart of the hierarchial tree diagram depicted in FIG. 4 and the data streams shown in FIG. 5. The locations of the data streams are shown in dashed lines in FIG. 6. The information portions 210 of the flames 200 are shown in FIG. 6 with similar numbering as in FIG. 5. The command portions, where shown, are illustrated as branches in the tree chart.

Because the information streams are capable of carrying branching instructions, and because of the hierarchial nature of the expert system, the number of streams may be reduced by "folding" the branches of the hierarchial tree. The "folding" approach simply optimizes the required number of streams required by making use of the program synchronization segments.

An example of "folding" the FIG. 6 hierarchial tree is shown in FIG. 7. Rather than remaining on data stream 103 after information portion 244, command portion 344 may instruct the interactive terminal to switch to data stream 102. This normally leads to an incorrect presentation because stream 102 is associated with the conclusion that the problem is in the speaker cables 243 while the conclusion represented at 244 is that the problem is in the interconnects. However, interim frame 251, 351 and 252, 352 are program synchronization or transition frames which are not stream specific. The conclusion frame is presented at 243 and cleared by program synchronization segment 251. At time T3, the user could not have viewed frame 243 if the user had been presented with frame 244, due to the hierarchy of the system. Thus, it is safe for the interactive terminal to switch to data stream 102 at time T3. Now, the two possible conclusions have been presented to the user and the interactive terminal is presenting nonspecific program information segments in frame 261, 361. This clears up data stream 103 and allows the branch from frame 245, 345 to go to stream 103, rather than stream 104. Thus, the branch from frame 245 has been "folded" up to stream 103. Likewise, frame 261, 361 may be instructed to branch to stream 101 at time T4. This frees up a frame on stream 102 so that frame 248, 348 may be "folded" to stream 102 and frame 249, 349 may be "folded" to stream 103. Thus, the number of streams has been reduced from five to three. The value of this technique is the conservation in the number of required streams thereby preserving valuable channel capacity in a transmission system. In this case, only three channels would be necessary.

The concept of "folding" need not resemble a physical bending of a branch on the hierarchial tree diagram, but includes the juxtaposition of frames and provision of stream jumps to decrease the number of required data streams.

While FIG. 7 discloses a very simple example, it will be clear to those skilled in the art that extremely complex interactive expert systems may be developed without a microprocessor to provide high levels of interactivity. For example, this type of system is applicable to financial analysis, document creation (i.e., wills, contracts, leases, etc.) or troubleshooting. The more streams of media that are available, the higher degree of parallelism and complex rule-base and overall expert system that becomes achievable.

Systems such as those described above may be implemented, for example, as point of sale kiosks. In a kiosk implementation, n channels of a program may be implemented on a videocassette which is contained in a videocassette player in the kiosk. A keypad, touch-screen or voice recognition technology on the face of the kiosk enables users to enter selections. Alternatively, the interactive program might be implemented as a how-to-program in a video on demand system.

In Table 3, a script is shown of an interactive expert system to help a person choose the proper tennis racket. Such a program might be used as a marketing tool in sporting goods stores, and the video portion of the program might include a celebrity to help the user select a racket. Due to the large number of factors which are involved in making the proper racket decision (which would potentially require a large number of channels or would be extremely long in length), a microprocessor is used to direct the storage of information in memory based upon the user responses. An algorithm is used to determine which racket is appropriate based upon the memory contents once all of the pertinent information has been gathered. Coding on the media tells the microprocessor to store the appropriate data as necessary. The microprocessor also directs switching between the channels as appropriate. It is important to note that this example can be implemented using the techniques discussed with reference to Example 1, without the need for using a microprocessor. For example, rather than storing the user's information in memory locations, the interactive program could branch to an entirely different set of data streams every time an input was necessary.

A generalized diagram of the frame locations and contents, similar to FIG. 5, is shown for the second example in FIG. 8, comprising FIGS. 8A, 8B, 8C, and 8D. As can be seen in the FIG. 8 frame diagram, the system asks for the user's age at time T0, gender at time T1, experience at time T2, rating at time T3, hit level at time T4, frequency of play at time T5, and weight at time T6. At time T7, the racquet algorithm is executed and racquets are recommended at times T8 or T9. At time T10, the string tension is recommended. At time T11, a grip width is suggested based on the previous gender response. At T12, a second racquet is recommended based on the frequency of use. Due to space constraints, FIG. 8 shows an abbreviated version of the frame contents. A more descriptive depiction of this example is provided below in Table 3.

This example differs from Example 1 in that the user's interactive responses are letters A–D rather than yes/no responses 1 or 2. It is to be understood that any type of input, including dedicated keys, may be used. The microprocessor of this embodiment contains multiple memory locations, addresses #1–#4 to store information entered by the user for subsequent calculation.

Unlike Example 1, the command portion of the frames contain instructions related to changing channels and storing information in variables. In this example, the command portion is used throughout the presentation to instruct the microprocessor on the storage of variables and stream switching. Also, in this example the command portion of the frame instructs the microprocessor to "switch" to the same channel rather than "stay" on the same channel, where appropriate. The artisan will recognize that both commands accomplish the same result. As with Example #1, information included in the command portion is enclosed in brackets { }. Also, the data streams and frames may be further "folded" or encoded from the hierarchial tree diagram, although not specifically exemplified here.

The rule-base and hierarchial diagrams of this example are not shown since Table 3 and FIG. 8 clearly depict the frame relationships.

TABLE 3

Script of Frame Contents for Tennis Racquet Selection Example.

| Time | Stream 101 | Stream 102 | Stream 103 | Stream 104 |
|------|------------|------------|------------|------------|
| T    | ...        | ...        | ...        | ...        |
| T0   | {switch to 101} Hi, I'm Mr. Tennis Pro and I'm here to help you pick the proper tennis racquet. All you have to do is answer a few questions for me. I'll analyze your answers and recommend exactly what will be best for you. First, how old are you? Under 15 - input A | {switch to 101} (unused) | {switch to 101} (unused) | {switch to 101} (unused) |

TABLE 3-continued

Script of Frame Contents for Tennis Racquet Selection Example.

| Time | Stream 101 | Stream 102 | Stream 103 | Stream 104 |
|---|---|---|---|---|
|  | 15–40 - input B 41–60 - input C Over 60 - input D Answer now. {if A, switch to 101, if B, switch to 102, if C, switch to 103, if D, switch to 104} |  |  |  |
| T1 | Thanks. I can now see that you are under 15 years old. Yo, it's never too soon to learn tennis.<br><br>{Put +1 in memory #1 } Are you male (Input A) or female (Input B)? Please indicate. {if A, switch to 101, if B, switch to 102} | Thanks. I can now see that you are between 15 and 40 years old. You are therefore at the peak of your game.<br><br>{Put 0 in memory #1} Are you male (Input A) or female (Input B)? Please indicate. {if A, switch to 101, if B, switch to 102} | Thanks. I can now see that you are between 41 and 60 years old. I started enjoying tennis the most after I turned 60.<br><br>{Put +2 in memory #1} Are you male (Input A) or female (Input B)? Please indicate. {if A, switch to 101, if B, switch to 102} (unused) | Thanks. I can now see that you are over 60 years old. You know people play tennis into their 90's and beyond.<br><br>{Put +4 in memory #1} Are you male (Input A) or female (Input B)? Please indicate. {if A, switch to 101, if B, switch to 102} (unused) |
| T2 | Thanks, sir.<br><br>{Add 0 to memory #1; Put "X" in memory #2} How long have you been playing tennis? Less than 1 yr. - input A 1–3 years - Input B 3–5 years - Input C over 5 years - input D Please indicate {if A, switch to 101, if B, switch to 102, if C, switch to 103, if D, switch to 104} | Thanks, madam.<br><br>{Add +2 to memory #1; Put"Y" in memory #2} How long have you been playing tennis? Less than 1 yr. - input A 1–3 years - Input B 3–5 years - Input C over 5 years - input D Please indicate {if A, switch to 101, if B, switch to 102, if C, switch to 103, if D, switch to 104} |  |  |
| T3 | {Add +3 to memory #1} Oh, a newcomer.<br><br>What type of player are you when it comes to ratings? Championship - Input D A - Input A B - Input B C - input C | {Add +2 to memory #1} 1 to 3 years. So you're pretty new to this.<br><br>What type of player are you when it comes to ratings? Championship - Input D A - Input A B - Input B C - input C | {Add +1 to memory #1} 3 to 5 years. Oh you're just getting good.<br><br>What type of player are you when it comes to ratings? Championship - Input D A - Input A B - Input B C - input C | {Add 0 to memory #1} Over 5 years. So you obviously enjoy tennis.<br><br>What type of player are you when it comes to ratings? Championship - Input D A - Input A B - Input B C - input C |
|  | Please indicate. {if A, switch to 102, if B switch to 103, if C, switch to 104, if D, switch to 101} | Please indicate. {if A, switch to 102, if B switch to 103, if C, switch to 104, if D, switch to 101} | Please indicate. {if A, switch to 102, if B switch to 103, if C, switch to 104, if D, switch to 101} | Please indicate. {if A, switch to 102, if B switch to 103, if C, switch to 104, if D, switch to 101} |
| T4 | {Add 0 to memory #1} Which of these describes the way you play best? Hit hard a lot - Input A Hit hard on occasion - Input B Rarely hit hard - Input C Never hit hard - Input D {if A, switch to 101, if B, switch to 102, if C switch to to 103, if D switch to 104} | {Add 1 to memory #1} Which of these describes the way you play best? Hit hard a lot - Input A Hit hard on occasion - Input B Rarely hit hard - Input C Never hit hard - Input D {if A, switch to 101, if B, switch to 102, if C switch to to 103, if D switch to 104} | {Add 3 to memory #1} Which of these describes the way you play best? Hit hard a lot - Input A Hit hard on occasion - Input B Rarely hit hard - Input C Never hit hard - Input D {if A, switch to 101, if B, switch to 102, if C switch to to 103, if D switch to 104} | {Add 5 to memory #1} Which of these describes the way you play best? Hit hard a lot- Input A Hit hard on occasion - Input B Rarely hit hard - Input C Never hit hard - Input D {if A, switch to 101, if B, switch to 102, if C switch to to 103, if D switch to 104} |
| T5 | {Add 0 to memory #1; Put 1 in memory #3} How often do you play? Once a week or less - Input A Twice a week - Input B Three times a week - Input C More than three times a week - Input D {if A switch to 101, if B, switch to 102, if C, switch to 103, if D, switch to 104} | {Add +1 to memory #1; Put 2 in memory #3} How often do you play? Once a week or less - Input A Twice a week - Input B Three times a week - Input C More than three times a week - Input D {if A switch to 101, if B, switch to 102, if C, switch to 103, if D, switch to 104} | {Add +2 to memory #1; Put 3 in memory #3} How often do you play? Once a week or less - Input A Twice a week - Input B Three times a week - Input C More than three times a week - Input D {if A switch to 101, if B, switch to 102, if C, switch to 103, if D, switch to 104} | {Add +3 to memory #1; Put 4 in memory #3} How often do you play? Once a week or less - Input A Twice a week - Input B Three times a week - Input C More than three times a week - Input D {if A switch to 101, if B, switch to 102, if C, switch to 103, if D, switch to 104} |
| T6 | {Add +2 to memory #1; Put a "J" in memory #4} Hey, once a week is not enough. Get out there and play more. | {Add +1 to memory #1; Put a "J" in memory #4} Hey, twice a week is not enough. Try to play 3 times a week. | {Add +1 to memory #1; Put "K" in memory #4} Three times a week is pretty good, but four times is better. | {Add 0 to memory #1; Put "K" in memory #4} Great. This is superb. The more you play the better and healthier you get. |
|  | How much do you weigh? 25–100 lbs. - Input A 101–150 lbs. - Input B 151–200 lbs. - Input C Over 200 lbs. - Input D {if A, switch to 101, if B, switch to 102, if C, switch to 103, if D, | How much do you weigh? 25–100 lbs. - Input A 101–150 lbs. - Input B 151–200 lbs. - Input C Over 200 lbs. - Input D {if A, switch to 101, if B, switch to 102, if C, switch to 103, if D, | How much do you weigh? 25–100 lbs. - Input A 101–150 lbs. - Input B 151–200 lbs. - Input C Over 200 lbs. - Input D {if A, switch to 101, if B, switch to 102, if C, switch to 103, if D, | How much do you weigh? 25–100 lbs. - Input A 101–150 lbs. - Input B 151–200 lbs. - Input C Over 200 lbs. - Input D {if A, switch to 101, if B, switch to 102, if C, switch to 103, if D, |

TABLE 3-continued

Script of Frame Contents for Tennis Racquet Selection Example.

| Time | Stream 101 | Stream 102 | Stream 103 | Stream 104 |
|---|---|---|---|---|
| T7 | switch to 104} {Add +2 to memory #1} I now have all your input and can evaluate which type of racquet, grip, and string tension is best for you. {If memory #1 ≥ +26, switch to 102; if memory #1 is ≥ 17 and ≤ 25 then switch to 103; if memory #1 ≥ 14 and ≤ 16 then switch to 104; otherwise switch to 101} | switch to 104} {Add + 1 to memory #1} I now have all your input and can evaluate which type of racquet, grip, and string tension is best for you. {If memory #1≥ +26, switch to 102; if memory #1 is ≥ 17 and ≤ 25 then switch to 103; if memory #1 ≥ 14 and ≤ 16 then switch to 104; otherwise switch to 101} | switch to 104} {Add 0 to memory #1} I now have all your input and can evaluate which type of racquet, grip, and string tension is best for you. {If memory #1 ≥ +26, switch to 102; if memory #1 is ≥ 17 and ≤ 25 then switch to 103; if memory #1 ≥ 14 and ≤ 16 then switch to 104; otherwise switch to 101} | switch to 104} {Add +4 to memory #1} I now have all your input and can evaluate which type of racquet, grip, and string tension is best for you. {If memory #1 ≥ +26, switch to 102; if memory #1 is ≥ 17 and ≤ 25 then switch to 103; if memory #1 ≥ 14 and ≤ 16 then switch to 104; otherwise switch to 101} |
| T8 | The following racquet will be the most appropriate model for you. {If memory # 1 ≤ 13 and ≥ 10 then switch to 102; If memory #1 ≥ 9 and ≤ 5 then switch to 103; If memory #1 ≤ 4 then switch to 104;} | I recommend the Zenith Model 206 racquet. {switch to 101} | I recommend the Zenith Model 208 racquet. {switch to 101} | I recommend the Zenith Model 210 racquet. {switch to 101} |
| T9 | You will find the above racquet most appropriate to your needs. {if memory #3 = 1 then switch to 101; if memory #3 = 2 then switch to 102; if memory #3 = 3 then switch to 103; if memory #3 = 4 then switch to 104} | I recommend the Zenith Model 212. {if memory #3 = 1 then switch to 101; if memory #3 = 2 then switch to 102; if memory #3 = 3 then switch to 103; if memory #3 = 4 then switch to 104} | I recommend the Zenith Model 214. {if memory #3 = 1 then switch to 101; if memory #3 = 2 then switch to 102; if memory #3 = 3 then switch to 103; if memory #3 = 4 then switch to 104} | I recommend the Zenith Model 216. {if memory #3 = 1 then switch to 101; if memory #3 = 2 then switch to 102; if memory #3 = 3 then switch to 103; if memory #3 = 4 then switch to 104} |
| T10 | The string tension should be set to 43 pounds. {if memory #2 = "X" then switch to 101; if memory #2 = "Y" then switch to 102} | The string tension should be set to 50 pounds. {if memory #2 = "X" then switch to 101; if memory #2 = "Y" then switch to 102} | The string tension should be set to 55 pounds. {if memory #2 = "X" then switch to 101; if memory #2 = "Y" then switch to 102} | The string tension should be set to 65 pounds. {if memory #2 = "X" then switch to 101; if memory #2 = "Y" then switch to 102} |
| T11 | Since you are male, get the widegrip model for men. {If memory #4 = "J" then switch to 101; if memory #4 = "K" then switch to 102} | Since you are female, get the slender grip model for women. {If memory #4 = "J" then switch to 101; if memory #4 = "K" then switch to 102} | (unused) | (unused) |
| T12 | Since you play at least 3 times a week, you may wish to buy two identical racquets in case you break a string. This entitles you to a 15% discount on the second racquet. It has been a pleasure helping you to select a tennis racket. Have a good day. {switch to 101} | Based on the number of times per week that you play, one racquet should be sufficient. If you take proper care of it, it should last about 2 years. It has been a pleasure helping you to select a tennis racket. Have a good day. {switch to 101} | (unused) | (unused) |

Although the present invention has been described in detail with respect to certain embodiments and examples, variations and modifications exist which are within the scope of the present invention as defined in the following claims.

I claim:

1. A method for offering expert based interactive programs to one or more users so that a high level of conversational responsiveness and interactivity is achieved, the method comprising:

defining a decision goal for an interactive scenario;

implementing a set of rules leading to the defined goal, the rules comprising at least one premise and a conclusion whereby the rules are related hierarchically to one another in that a conclusion of at least one of the rules is a premise of another rule;

forming queries, each query corresponding to a premise which requires a user response to determine the existence of the premise;

mapping the queries and rules into a plurality of media independent data streams to generate an interactive program, the plurality of data streams containing frames, the frames being time-synchronized between data streams and containing an information portion and a command portion;

storing the data streams in an interactive storage medium;

retrieving the plurality of data streams from the interactive storage medium; and whereby the retrieved data streams offer the expert based interactive programs to the one or more users.

2. A method for receiving expert based interactive programs at one or more interactive terminals, each interactive program comprising a plurality of media independent data streams, the method comprising:

receiving the plurality of data streams, each data stream having a plurality of time-synchronized frames, wherein the frames contain embedded expert system rules and queries, the rules being hierarchically related to one another and comprising at least one premise and a conclusion;

selecting a frame from a single data stream out of the plurality of provided data streams using a signal selector, whereby the selected frame comprises a query;

presenting the query to a user through an interactive output device;

receiving a user entry in response to the presented query;

determining a next frame hierarchically related to the selected frame, the next frame determined based on the received user entry and the selected frame; and obtaining the next frame using the signal selector, whereby the next frame contains another query or a conclusion to an expert system rule.

3. The method according to claim 2, wherein the step of obtaining comprises:

interpreting the received user entry and the selected frame to ascertain the location of the next frame;

choosing a data stream which corresponds to the interpreted location, where the selected data stream is chosen from the plurality of data streams including the single data stream.

4. A method of creating and storing an expert-based interactive program on an interactive media, the method comprising:

defining a goal for the expert-based program;

developing hierarchial rules related to the defined goal, the hierarchial rules containing premises and conclusions, wherein the rules are hierarchically linked together in that the conclusions of some rules are the premises of other rules;

forming queries, each query corresponding to a premise which requires a user response to determine the existence of the premise;

translating the queries and rules into a hierarchial tree diagram, wherein the hierarchial tree diagram logically organizes and relates the rules to one another by using branches;

mapping the hierarchial tree diagram into a plurality of media independent data streams in a predetermined sequence to generate an interactive program, each data stream having one or more frames related in content, wherein the frames represent and completely implement the branches of the hierarchical tree diagram; and storing the plurality of data streams in the interactive media.

5. A method for offering expert based interactive programs to one or more users using one or more dynamically allocated data streams in order to conserve channel capacity, the method comprising:

defining a decision goal for an interactive scenario;

implementing a set of rules leading to the defined goal, each rule comprising at least one premise and a conclusion whereby the rules are related hierarchically to one another in that a conclusion of at least one of the rules is a premise of another rule;

generating queries corresponding to premises, each query requiring a user response to determine the existence of the premise;

mapping the queries and rules into a plurality of media independent data streams to generate an interactive program, each data stream containing one or more frames, the frames being time-synchronized between data streams and at least one frame containing an information message and a command message;

identifying a number of data streams to be transmitted during a frame interval, the number corresponding to the number of time-synchronized frames during the frame interval which contain an information message and a command message; and transmitting the identified number of data streams dynamically during a current frame interval over a communications medium to an interactive terminal, wherein only those data streams having a frame with an information message and a command message are transmitted during the current frame interval.

6. A method of offering an expert-based system as an interactive program, contained on a plurality of media independent data streams, to one or more users so that a high level of conversational responsiveness and interactivity is achieved with an efficient number of data streams, the method comprising:

defining a goal for the expert-based system;

developing hierarchial rules related to the defined goal, the hierarchial rules containing premises and conclusions, wherein the rules are hierarchically linked together in that the conclusions to some rules are premises of other rules;

forming queries, each query corresponding to a premise that requires a user entry to determine the existence of the premise;

translating the queries and rules into a hierarchial tree diagram, wherein the hierarchial tree diagram logically organizes and relates the rules to one another by using branches;

mapping the hierarchial tree diagram into a plurality of data streams, each data stream having one or more frames related in content, with some of the frames containing information messages and command messages and other frames containing program synchronization segments, wherein the data streams represent and completely implement the branches of the hierarchical tree diagram;

folding frames containing information messages and command messages from at least one data stream into frames of other data streams containing only program synchronization segments, wherein the total number of required data streams is reduced to include at least one compacted data stream;

storing the reduced number of data streams, including the compacted data stream, in an interactive storage medium;

retrieving the reduced number of data streams from the interactive storage medium to an interactive terminal; and whereby efficiency is improved by the storage and retrieval of the reduced number of data streams.

7. An expert based interactive system for offering to one or more users a high level of conversational responsiveness and interactivity, comprising:

a means for storing media independent data streams of interactive data, the interactive data comprised of time-synchronized frames containing premises, queries, and conclusions which represent rules of a hierarchial rule-base, the hierarchial rule-base formed in that at least one premise of one rule is a conclusion of another rule;

a means, connected to the storing means, for sending one or more of the stored data streams to at least one interactive terminal;

the interactive terminal for providing an interactive presentation to one or more users comprising;

a means for gathering a frame located on one of the sent data streams, wherein the frame includes instructions indicating a query;

a means, connected to the means for gathering, for generating an interactive query based on the instructions of the gathered frame;

a means, connected to the means for generating, for presenting the generated query to a user;

a means for receiving an interactive entry from the user to the generated interactive query;

a means, connected to the gathering means and the receiving means, for obtaining a next frame from any data stream, wherein the means for obtaining comprises a means for determining the next frame based on the contents of the gathered frame and the user's interactive entry; and whereby the user's interactive entries result in a high level of conversational responsiveness and interactivity.

8. The system of claim 7 wherein the means for generating a query comprises a second means for storing at least one or more queries.

9. The system of claim 7 wherein the interactive terminal further comprises a processor, connected to the gathering means and obtaining means, for interpreting the gathered frame and executing the instructions contained in the gathered frame.

10. An interactive terminal for receiving an expert based interactive program, comprising:

a means for receiving one or more media independent data streams of interactive data, the interactive data comprised of time-synchronized frames comprising premises, queries, and conclusions which represent rules of a hierarchial rule-base, the hierarchial rule-base formed in that at least one premise of one rule is a conclusion of another rule;

a means for gathering a frame located on one of the received data streams, wherein the frame includes instructions indicating a query;

a means, connected to the means for gathering, for generating an interactive query based on the instructions of the gathered frame;

a means, connected to the means for generating, for presenting the generated query to a user;

a means for receiving an interactive entry from the user to the generated interactive query; and a means, connected to the gathering means and the receiving means, for obtaining a next frame from any received data stream, wherein the means for obtaining comprises a means for determining the next frame based on the contents of the gathered frame and the user's interactive entry.

* * * * *